US008952995B2

(12) United States Patent
Umezaki et al.

(10) Patent No.: US 8,952,995 B2
(45) Date of Patent: Feb. 10, 2015

(54) DRIVING METHOD OF DISPLAY DEVICE AND DISPLAY DEVICE

(75) Inventors: Atsushi Umezaki, Kanagawa (JP); Toshikazu Kondo, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 859 days.

(21) Appl. No.: 12/877,660

(22) Filed: Sep. 8, 2010

(65) Prior Publication Data

US 2011/0063339 A1 Mar. 17, 2011

(30) Foreign Application Priority Data

Sep. 16, 2009 (JP) ................................ 2009-214961

(51) Int. Cl.

| | |
|---|---|
| ***G09G 5/10*** | (2006.01) |
| ***G09G 3/34*** | (2006.01) |
| ***G09G 3/36*** | (2006.01) |
| ***G06F 3/038*** | (2013.01) |

(52) U.S. Cl.

CPC ............ *G09G 3/344* (2013.01); *G09G 2300/08* (2013.01); *G09G 2310/06* (2013.01)

USPC .............. 345/690; 345/107; 345/99; 345/213

(58) Field of Classification Search

CPC G09G 3/344; G09G 2300/08; G09G 2310/06

USPC ..................... 345/107, 76, 84–100, 204–213, 345/690–699; 250/214 R

See application file for complete search history.

(56) References Cited

U.S. PATENT DOCUMENTS

| | | | |
|---|---|---|---|
| 5,731,856 | A | 3/1998 | Kim et al. |
| 5,744,864 | A | 4/1998 | Cillessen et al. |
| 6,294,274 | B1 | 9/2001 | Kawazoe et al. |
| 6,563,174 | B2 | 5/2003 | Kawasaki et al. |
| 6,650,462 | B2 | 11/2003 | Katase |

(Continued)

FOREIGN PATENT DOCUMENTS

| | | | |
|---|---|---|---|
| EP | 1 737 044 | A1 | 12/2006 |
| EP | 1742194 | A | 1/2007 |

(Continued)

OTHER PUBLICATIONS

International Search Report, PCT Application No. PCT/JP2010/064542, dated Oct. 26, 2010, 3 pages.

(Continued)

*Primary Examiner* — Kent Chang
*Assistant Examiner* — Kuo Woo
(74) *Attorney, Agent, or Firm* — Fish & Richardson P.C.

(57) ABSTRACT

It is an object to reduce power consumption of a display device which can perform multi-gray scale display and to suppress deterioration of an element included in the display device. The usage of a display device includes a first initialization period in which the gray scale level of an entire pixel portion is converted into a first gray scale level and a second initialization period in which the gray scale level of an entire pixel portion is converted into a second gray scale level. In the first initialization period, scanning of a plurality of signals and weighting of a holding period of each signal are performed. Therefore, the small number of scanning of signals can realize voltage application for an appropriate time with respect to each of a plurality of gray scale storage display elements included in the display device.

35 Claims, 8 Drawing Sheets

(56) References Cited

U.S. PATENT DOCUMENTS

| | | | |
|---|---|---|---|
| 6,727,522 | B1 | 4/2004 | Kawasaki et al. |
| 6,774,884 | B2 | 8/2004 | Shimoda et al. |
| 7,019,889 | B2 | 3/2006 | Katase |
| 7,049,190 | B2 | 5/2006 | Takeda et al. |
| 7,061,014 | B2 | 6/2006 | Hosono et al. |
| 7,064,346 | B2 | 6/2006 | Kawasaki et al. |
| 7,105,868 | B2 | 9/2006 | Nause et al. |
| 7,109,969 | B2 | 9/2006 | Zhou et al. |
| 7,126,577 | B2 | 10/2006 | Zhou et al. |
| 7,211,825 | B2 | 5/2007 | Shih et al |
| 7,282,782 | B2 | 10/2007 | Hoffman et al. |
| 7,297,977 | B2 | 11/2007 | Hoffman et al. |
| 7,323,356 | B2 | 1/2008 | Hosono et al. |
| 7,359,110 | B2 | 4/2008 | Katase |
| 7,385,224 | B2 | 6/2008 | Ishii et al. |
| 7,402,506 | B2 | 7/2008 | Levy et al. |
| 7,411,209 | B2 | 8/2008 | Endo et al. |
| 7,439,948 | B2 | 10/2008 | Johnson et al. |
| 7,453,065 | B2 | 11/2008 | Saito et al. |
| 7,453,087 | B2 | 11/2008 | Iwasaki |
| 7,462,862 | B2 | 12/2008 | Hoffman et al. |
| 7,468,304 | B2 | 12/2008 | Kaji et al. |
| 7,501,293 | B2 | 3/2009 | Ito et al. |
| 7,674,650 | B2 | 3/2010 | Akimoto et al. |
| 7,701,436 | B2 | 4/2010 | Miyasaka |
| 7,732,819 | B2 | 6/2010 | Akimoto et al. |
| 7,786,974 | B2 | 8/2010 | Zhou et al. |
| 7,872,633 | B2 | 1/2011 | Zhou et al. |
| 7,876,305 | B2 | 1/2011 | Zhou et al. |
| 8,130,190 | B2 * | 3/2012 | Kudo et al. .................... 345/99 |
| 2001/0046027 | A1 | 11/2001 | Tai et al. |
| 2002/0056838 | A1 | 5/2002 | Ogawa |
| 2002/0132454 | A1 | 9/2002 | Ohtsu et al. |
| 2003/0189401 | A1 | 10/2003 | Kido et al. |
| 2003/0218222 | A1 | 11/2003 | Wager, III et al. |
| 2004/0038446 | A1 | 2/2004 | Takeda et al. |
| 2004/0127038 | A1 | 7/2004 | Carcia et al. |
| 2005/0017302 | A1 | 1/2005 | Hoffman |
| 2005/0199959 | A1 | 9/2005 | Chiang et al. |
| 2006/0035452 | A1 | 2/2006 | Carcia et al. |
| 2006/0043377 | A1 | 3/2006 | Hoffman et al. |
| 2006/0050050 | A1 | 3/2006 | Zhou et al. |
| 2006/0071902 | A1 | 4/2006 | Zhou et al. |
| 2006/0077190 | A1 | 4/2006 | Zhou et al. |
| 2006/0091793 | A1 | 5/2006 | Baude et al. |
| 2006/0108529 | A1 | 5/2006 | Saito et al. |
| 2006/0108636 | A1 | 5/2006 | Sano et al. |
| 2006/0110867 | A1 | 5/2006 | Yabuta et al. |
| 2006/0113536 | A1 | 6/2006 | Kumomi et al. |
| 2006/0113539 | A1 | 6/2006 | Sano et al. |
| 2006/0113549 | A1 | 6/2006 | Den et al. |
| 2006/0113565 | A1 | 6/2006 | Abe et al. |
| 2006/0132426 | A1 | 6/2006 | Johnson |
| 2006/0139309 | A1 * | 6/2006 | Miyasaka .................... 345/107 |
| 2006/0169973 | A1 | 8/2006 | Isa et al. |
| 2006/0170111 | A1 | 8/2006 | Isa et al. |
| 2006/0170648 | A1 | 8/2006 | Zhou et al. |
| 2006/0192751 | A1 * | 8/2006 | Miyasaka et al. ............ 345/107 |
| 2006/0197092 | A1 | 9/2006 | Hoffman et al. |
| 2006/0208977 | A1 | 9/2006 | Kimura |
| 2006/0228974 | A1 | 10/2006 | Thelss et al. |
| 2006/0231882 | A1 | 10/2006 | Kim et al. |
| 2006/0238135 | A1 | 10/2006 | Kimura |
| 2006/0244107 | A1 | 11/2006 | Sugihara et al. |
| 2006/0284171 | A1 | 12/2006 | Levy et al. |
| 2006/0284172 | A1 | 12/2006 | Ishii |
| 2006/0292777 | A1 | 12/2006 | Dunbar |
| 2007/0002008 | A1 | 1/2007 | Tam |
| 2007/0024187 | A1 | 2/2007 | Shin et al. |
| 2007/0040104 | A1 * | 2/2007 | Miyazawa ............... 250/214 R |
| 2007/0046191 | A1 | 3/2007 | Saito |
| 2007/0052025 | A1 | 3/2007 | Yabuta |
| 2007/0054507 | A1 | 3/2007 | Kaji et al. |
| 2007/0090365 | A1 | 4/2007 | Hayashi et al. |
| 2007/0108446 | A1 | 5/2007 | Akimoto |
| 2007/0152217 | A1 | 7/2007 | Lai et al. |
| 2007/0172591 | A1 | 7/2007 | Seo et al. |
| 2007/0187678 | A1 | 8/2007 | Hirao et al. |
| 2007/0187760 | A1 | 8/2007 | Furuta et al. |
| 2007/0194379 | A1 | 8/2007 | Hosono et al. |
| 2007/0247417 | A1 | 10/2007 | Miyazaki et al. |
| 2007/0252928 | A1 | 11/2007 | Ito et al. |
| 2007/0272922 | A1 | 11/2007 | Kim et al. |
| 2007/0287296 | A1 | 12/2007 | Chang |
| 2008/0006877 | A1 | 1/2008 | Mardilovich et al. |
| 2008/0038882 | A1 | 2/2008 | Takechi et al. |
| 2008/0038929 | A1 | 2/2008 | Chang |
| 2008/0050595 | A1 | 2/2008 | Nakagawara et al. |
| 2008/0073653 | A1 | 3/2008 | Iwasaki |
| 2008/0074357 | A1 * | 3/2008 | Kanda ............................. 345/76 |
| 2008/0083950 | A1 | 4/2008 | Pan et al. |
| 2008/0106191 | A1 | 5/2008 | Kawase |
| 2008/0128689 | A1 | 6/2008 | Lee et al. |
| 2008/0129195 | A1 | 6/2008 | Ishizaki et al. |
| 2008/0143668 | A1 | 6/2008 | Shin et al. |
| 2008/0166834 | A1 | 7/2008 | Kim et al. |
| 2008/0182358 | A1 | 7/2008 | Cowdery-Corvan et al. |
| 2008/0224133 | A1 | 9/2008 | Park et al. |
| 2008/0254569 | A1 | 10/2008 | Hoffman et al. |
| 2008/0258139 | A1 | 10/2008 | Ito et al. |
| 2008/0258140 | A1 | 10/2008 | Lee et al. |
| 2008/0258141 | A1 | 10/2008 | Park et al. |
| 2008/0258143 | A1 | 10/2008 | Kim et al. |
| 2008/0296568 | A1 | 12/2008 | Ryu et al. |
| 2009/0068773 | A1 | 3/2009 | Lai et al. |
| 2009/0073325 | A1 | 3/2009 | Kuwabara et al. |
| 2009/0114910 | A1 | 5/2009 | Chang |
| 2009/0134399 | A1 | 5/2009 | Sakakura et al. |
| 2009/0141202 | A1 | 6/2009 | Yoshida |
| 2009/0152506 | A1 | 6/2009 | Umeda et al. |
| 2009/0152541 | A1 | 6/2009 | Maekawa et al. |
| 2009/0278122 | A1 | 11/2009 | Hosono et al. |
| 2009/0280600 | A1 | 11/2009 | Hosono et al. |
| 2010/0065844 | A1 | 3/2010 | Tokunaga |
| 2010/0092800 | A1 | 4/2010 | Itagaki et al. |
| 2010/0109002 | A1 | 5/2010 | Itagaki et al. |
| 2010/0149169 | A1 | 6/2010 | Miyasaka |

FOREIGN PATENT DOCUMENTS

| | | | |
|---|---|---|---|
| EP | 2 226 847 | A2 | 9/2010 |
| GB | 2444794 | A | 6/2008 |
| JP | 60-198861 | A | 10/1985 |
| JP | 63-210022 | A | 8/1988 |
| JP | 63-210023 | A | 8/1988 |
| JP | 63-210024 | A | 8/1988 |
| JP | 63-215519 | A | 9/1988 |
| JP | 63-239117 | A | 10/1988 |
| JP | 63-265818 | A | 11/1988 |
| JP | 05-251705 | A | 9/1993 |
| JP | 08-264794 | A | 10/1996 |
| JP | 11-505377 | A | 5/1999 |
| JP | 2000-044236 | A | 2/2000 |
| JP | 2000-150900 | A | 5/2000 |
| JP | 2002-076356 | A | 3/2002 |
| JP | 2002-116733 | A | 4/2002 |
| JP | 2002-169190 | A | 6/2002 |
| JP | 2002-289859 | A | 10/2002 |
| JP | 2003-086000 | A | 3/2003 |
| JP | 2003-086808 | A | 3/2003 |
| JP | 2004-102055 | A | 4/2004 |
| JP | 2004-103957 | A | 4/2004 |
| JP | 2004-273614 | A | 9/2004 |
| JP | 2004-273732 | A | 9/2004 |
| JP | 2006-189466 | A | 7/2006 |
| JP | 2006-526162 | | 11/2006 |
| JP | 2007-017969 | A | 1/2007 |
| JP | 2007-519026 | | 7/2007 |
| JP | 2007-206471 | A | 8/2007 |
| JP | 2007-316594 | A | 12/2007 |
| JP | 2008-152228 | A | 7/2008 |
| JP | 2008-256987 | A | 10/2008 |
| JP | 2009-128448 | A | 6/2009 |
| JP | 2009-151292 | A | 7/2009 |

(56) References Cited

FOREIGN PATENT DOCUMENTS

| | | | |
|---|---|---|---|
| WO | WO-02/073304 | | 9/2002 |
| WO | WO-03/079323 | | 9/2003 |
| WO | WO-03/079324 | | 9/2003 |
| WO | WO-03/100515 | | 12/2003 |
| WO | WO-03/100757 | | 12/2003 |
| WO | WO-03/100758 | | 12/2003 |
| WO | WO-2004/066251 | | 8/2004 |
| WO | WO-2004/066252 | | 8/2004 |
| WO | WO-2004/066253 | | 8/2004 |
| WO | WO-2004/066254 | | 8/2004 |
| WO | WO-2004/066256 | | 8/2004 |
| WO | WO-2004/066257 | | 8/2004 |
| WO | 2004/114391 | A1 | 12/2004 |
| WO | WO-2005/008623 | | 1/2005 |
| WO | 2009/069674 | A1 | 6/2009 |

OTHER PUBLICATIONS

Written Opinion, PCT Application No. PCT/JP2010/064542, dated Oct. 26, 2010, 5 pages.

Asakuma, N et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184.

Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.

Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.

Cho, D et al., "21.2: Al and Sn-Doped Zinc Indium Oxide Thin Film Transistors for AMOLED Back-Plane," SID Digest '09 : SID International Symposium Digest of Technical Papers, May 31, 2009, pp. 280-283.

Clark, S et al., "First Principles Methods Using CASTEP," Zeitschrift fur Kristallographie, 2005, vol. 220, pp. 567-570.

Coates. D et al., Optical Studies of the Amorphous Liquid-Cholesteric Liquid Crystal Transition: The "Blue Phase," Physics Letters, Sep. 10, 1973, vol. 45A, No. 2, pp. 115-116.

Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.

Dembo, H et al., "RFCPUS on Glass and Plastic Substrates Fabricated by TFT Transfer Technology," IEDM 05: Technical Digest of International Electron Devices Meeting, Dec. 5, 2005, pp. 1067-1069.

Fortunato, E et al., "Wide-Bandgap High-Mobility ZnO Thin-Film Transistors Produced at Room Temperature," Appl. Phys. Lett. (Applied Physics Letters), Sep. 27, 2004, vol. 85, No. 13, pp. 2541-2543.

Fung, T et al., "2-D Numerical Simulation of High Performance Amorphous In—Ga—Zn—O TFTs for Flat Panel Displays," AM-FPD '08 Digest of Technical Papers, Jul. 2, 2008, pp. 251-252, The Japan Society of Applied Physics.

Godo, H et al., "P-9: Numerical Analysis on Temperature Dependence of Characteristics of Amorphous In—Ga—Zn—Oxide TFT," SID Digest '09 : SID International Symposium Digest of Technical Papers, May 31, 2009, pp. 1110-1112.

Godo, H et al., "Temperature Dependence of Characteristics and Electronic Structure for Amorphous In—Ga—Zn—Oxide TFT," AM-FPD '09 Digest of Technical Papers, Jul. 1, 2009, pp. 41-44.

Hayashi, R et al., "42.1: Invited Paper: Improved Amorphous In—Ga—Zn—O Tfts," SID Digest '08 : SID International Symposium Digest of Technical Papers, May 20, 2008, vol. 39, pp. 621-624.

Hirao, T et al.. "Novel Top-Gate Zinc Oxide Thin-Film Transistors (ZnO TFTs) for AMLCDs," Journal of the SID , 2007, vol. 15, No. 1, pp. 17-22.

Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.

Hosono, H, "68.3: Invited Paper:Transparent Amorphous Oxide Semiconductors for High Performance TFT," SID Digest '07 : SID International Symposium Digest of Technical Papers, 2007, vol. 38, pp. 1830-1833.

Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.

Ikeda., T et al., "Full-Functional System Liquid Crystal Display Using CG-Silicon Technology," SID Digest '04 : SID International Symposium Digest of Technical Papers, 2004, vol. 35, pp. 860-863.

Janotti, A et al., "Native Point Defects in ZnO," Phys. Rev. B (Physical Review. B), 2007, vol. 76, No. 16, pp. 165202-1-165202-22.

Janotti, A et al., "Oxygen Vacancies in ZnO," Appl. Phys. Lett. (Applied Physics Letters), 2005, vol. 87, pp. 122102-1-122102-3.

Jeong, J et al., "3.1: Distinguished Paper: 12.1-Inch WXGA AMOLED Display Driven by Indium—Gallium—Zinc Oxide TFTs Array," SID Digest '08 : SID International Symposium Digest of Technical Papers, May 20, 2008, vol. 39, No. 1, pp. 1-4.

Jin, D et al., "65.2: Distinguished Paper:World-Largest (6.5") Flexible Full Color Top Emission AMOLED Display on Plastic Film and Its Bending Properties," SID Digest '09 : SID International Symposium Digest of Technical Papers, May 31, 2009, pp. 983-985.

Kanno, H et al., "White Stacked Electrophosphorecent Organic Light-Emitting Devices Employing MOO3 as a Charge-Generation Layer," Adv. Mater. (Advanced Materials), 2006, vol. 18, No. 3, pp. 339-342.

Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.

Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.

Kikuchi, H et al., "Polymer-Stabilized Liquid Crystal Blue Phases," Nature Materials, Sep. 1, 2002, vol. 1, pp. 64-68.

Kim, S et al., "High-Performance oxide thin film transistors passivated by various gas plasmas," The Electrochemical Society, 214th ECS Meeting, 2008, No. 2317, 1 page.

Kimizuka, N et al., "Spinel,YbFe2O4, and Yb2Fe3O7 Types of Structures for Compounds in the In2O3 and Sc2O3—A2O3—Bo Systems [A; Fe, Ga, or Al; B: Mg, Mn, Fe, Ni, Cu,or Zn] at Temperatures Over 1000° C.," Journal of Solid State Chemistry, 1985, vol. 60, pp. 382-384.

Kimizuka, N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System," Journal of Solid State Chemistry, Apr. 1, 1995, vol. 116, No. 1, pp. 170-178.

Kitzerow, H et al., "Observation of Blue Phases in Chiral Networks," Liquid Crystals, 1993, vol. 14, No. 3, pp. 911-916.

Kurokawa, Y et al., "UHF RFCPUS on Flexible and Glass Substrates for Secure RFID Systems," Journal of Solid-State Circuits , 2008, vol. 43, No. 1, pp. 292-299.

Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.

Lee, H et al., "Current Status of, Challenges to, and Perspective View of AM-OLED," IDW '06 : Proceedings of the 13th International Display Workshops, Dec. 7, 2006, pp. 663-666.

Lee, J et al., "World's Largest (15-Inch) XGA AMLCD Panel Using IGZO Oxide TFT," SID Digest '08 : SID International Symposium Digest of Technical Papers, May 20, 2008, vol. 39, pp. 625-628.

Lee, M et al., "15.4: Excellent Performance of Indium-Oxide-Based Thin-Film Transistors by DC Sputtering," SID Digest '09 : SID International Symposium Digest of Technical Papers, May 31, 2009, pp. 191-193.

(56) References Cited

OTHER PUBLICATIONS

Li, C et al., "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.
Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.
Meiboom, S et al., "Theory of the Blue Phase of Cholesteric Liquid Crystals," Phys. Rev. Lett. (Physical Review Letters), May 4, 1981, vol. 46, No. 18, pp. 1216-1219.
Miyasaka, M, "SUFTLA Flexible Microelectronics on Their Way to Business," SID Digest '07 : SID International Symposium Digest of Technical Papers, 2007, vol. 38, pp. 1673-1676.
Mo, Y et al., "Amorphous Oxide TFT Backplanes for Large Size AMOLED Displays," ISW '08 : Proceedings of the 6th International Display Workshops, Dec. 3, 2008, pp. 581-584.
Nakamura, "Synthesis of Homologous Compound with New Long-Period Structure," NIRIM Newsletter, Mar. 1995, vol. 150, pp. 1-4 with English translation.
Nakamura, M et al., "The phase relations in the In2O3—Ga2ZnO4—ZnO system at 1350° C.," Journal of Solid State Chemistry, Aug. 1, 1991, vol. 93, No. 2, pp. 298-315.
Nomura, K et al., "Thin-Film Transistor Fabricated in Single-Crystalline Transparent Oxide Semiconductor," Science, May 23, 2003, vol. 300, No. 5623, pp. 1269-1272.
Nomura, K et al., "Amorphous Oxide Semiconductors for High-Performance Flexible Thin-Film Transistors," Jpn. J. Appl. Phys. (Japanese Journal of Applied Physics) , 2006, vol. 45, No. 5B, pp. 4303-4308.
Nomura, K et al., "Room-Temperature Fabrication of Transparent Flexible Thin-Film Transistors Using Amorphous Oxide Semiconductors," Nature, Nov. 25, 2004, vol. 432, pp. 488-492.
Nomura, K et al., "Carrier transport in transparent oxide semiconductor with intrinsic structural randomness probed using single-crystalline InGaO3(ZnO)5 films," Appl. Phys. Lett. (Applied Physics Letters) , Sep. 13, 2004, vol. 85, No. 11, pp. 1993-1995.
Nowatari, H et al., "60.2: Intermediate Connector With Suppressed Voltage Loss for White Tandem OLEDs," SID Digest '09 : SID International Symposium Digest of Technical Papers, May 31, 2009, vol. 40, pp. 899-902.
Oba, F et al., "Defect energetics in ZnO: A hybrid Hartree-Fock density functional study," Phys. Rev. B (Physical Review. B), 2008, vol. 77, pp. 245202-1-245202-6.
Oh, M et al., "Improving the Gate Stability of ZnO Thin-Film Transistors With Aluminum Oxide Dielectric Layers," J. Electrochem. Soc. (Journal of the Electrochemical Society), 2008, vol. 155, No. 12, pp. H1009-H1014.
Ohara, H et al., "21.3: 4.0 In. QVGA AMOLED Display Using In—Ga—Zn—Oxide TFTs With a Novel Passivation Layer," SID Digest '09 : SID International Symposium Digest of Technical Papers, May 31, 2009, pp. 284-287.
Ohara, H et al., "Amorphous In—Ga—Zn—Oxide TFTs with Suppressed Variation for 4.0 inch QVGA AMOLED Display," AM-FPD '09 Digest of Technical Papers, Jul. 1, 2009, pp. 227-230, The Japan Society of Applied Physics.
Orita, M et al., "Amorphous transparent conductive oxide InGaO3(ZnO)m (m<4):a Zn4s conductor," Philosophical Magazine, 2001, vol. 81, No. 5, pp. 501-515.
Orita, M et al., "Mechanism of Electrical Conductivity of Transparent InGaZnO4," Phys. Rev. B (Physical Review. B), Jan. 15, 2000, vol. 61, No. 3, pp. 1811-1816.
Osada, T et al., "15.2: Development of Driver-Integrated Panel using Amorphous In—Ga—Zn—Oxide TFT," SID Digest '09 : SID International Symposium Digest of Technical Papers, May 31, 2009, pp. 184-187.
Osada, T et al., "Development of Driver-Integrated Panel Using Amorphous In—Ga—Zn—Oxide TFT," AM-FPD '09 Digest of Technical Papers, Jul. 1, 2009, pp. 33-36.
Park, J et al., "Dry etching of ZnO films and plasma-induced damage to optical properties," J. Vac. Sci. Technol. B (Journal of Vacuum Science & Technology B), Mar. 1, 2003, vol. 21, No. 2, pp. 800-803.
Park, J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.
Park, J et al., "Electronic Transport Properties of Amorphous Indium—Gallium—Zinc Oxide Semiconductor Upon Exposure to Water," Appl. Phys. Lett. (Applied Physics Letters), 2008, vol. 92, pp. 072104-1-072104-3.
Park, J et al., "High performance amorphous oxide thin film transistors with self-aligned top-gate structure," IEDM 09: Technical Digest of International Electron Devices Meeting, Dec. 7, 2009, pp. 191-194.
Park, Sang-Hee et al., "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.
Park, J et al., "Amorphous Indium—Gallium—Zinc Oxide TFTs and Their Application for Large Size AMOLED," AM-FPD '08 Digest of Technical Papers, Jul. 2, 2008, pp. 275-278.
Park, S et al., "Challenge to Future Displays: Transparent AM-OLED Driven by PEALD Grown ZnO TFT," IMID '07 Digest, 2007, pp. 1249-1252.
Prins, M et al., "A Ferroelectric Transparent Thin-Film Transistor," Appl. Phys. Lett. (Applied Physics Letters), Jun. 17, 1996, vol. 68, No. 25, pp. 3650-3652.
Sakata, J et al., "Development of 4.0-In. AMOLED Display With Driver Circuit Using Amorphous In—Ga—Zn—Oxide TFTs," IDW '09 : Proceedings of the 16th International Display Workshops, 2009, pp. 689-692.
Son, K et al., "42.4L: Late-News Paper: 4 Inch QVGA AMOLED Driven by the Threshold Voltage Controlled Amorphous GIZO (Ga2O3—In2O3—ZnO) TFT," SID Digest '08 : SID International Symposium Digest of Technical Papers, May 20, 2008, vol. 39, pp. 633-636.
Takahashi, M et al., "Theoretical Analysis of IGZO Transparent Amorphous Oxide Semiconductor," IDW '08 : Proceedings of the 15th International Display Workshops, Dec. 3, 2008, pp. 1637-1640.
Tsuda, K et al., "Ultra Low Power Consumption Technologies for Mobile TFT-LCDs," IDW '02 : Proceedings of the 9th International Display Workshops, Dec. 4, 2002, pp. 295-298.
Ueno, K et al., "Field-Effect Transistor on SrTiO3 With Sputtered Al2O3 Gate Insulator," Appl. Phys. Lett. (Applied Physics Letters), Sep. 1, 2003, vol. 83, No. 9, pp. 1755-1757.
Van De Walle, C, "Hydrogen as a Cause of Doping in Zinc Oxide," Phys. Rev. Lett. (Physical Review Letters), Jul. 31, 2000, vol. 85, No. 5, pp. 1012-1015.

* cited by examiner

DRIVING METHOD OF DISPLAY DEVICE AND DISPLAY DEVICE

TECHNICAL FIELD

The present invention relates to a driving method of a display device including a gray scale storage display element. Further, the present invention relates to a display device.

BACKGROUND ART

A display device including a gray scale storage display element such as an electrophoresis element has attracted attention as one of display devices that can be driven with low power consumption. The display device has an advantage in that images can be held without power supply, whereby it is expected that the display device will be applied to an electronic book reader, a poster, or the like.

Display devices including various kinds of gray scale storage display elements have been proposed. For example, an active matrix display device formed using a transistor as a switching element of a pixel as in a liquid crystal display device or the like has been proposed (e.g., see Patent Document 1).

Further, a variety of driving methods of the display device has been proposed. For example, the following image switching method has been proposed: before images to be obtained are displayed, an entire display portion is converted into a first gray scale (e.g., white), which is sequentially converted into a second gray scale (e.g., black) when images are switched (e.g., see Patent Document 2).

REFERENCE

[Patent Document 1] Japanese Published Patent Application No. 2002-169190

[Patent Document 2] Japanese Published Patent Application No. 2007-206471

DISCLOSURE OF INVENTION

It is an object of one embodiment of the present invention to provide a driving method of a display device, which can perform multi-gray scale display.

Alternatively, it is an object of one embodiment of the present invention to provide a driving method of a display device in which a residual image is compressed.

Alternatively, it is an object of one embodiment of the present invention to provide a driving method of a display device that achieves low power consumption.

Alternatively, it is an object of one embodiment of the present invention to provide a driving method of a display device, which can suppress deterioration of an element included in the display device.

Alternatively, it is an object of one embodiment of the present invention to provide a display device operated by the above driving method.

An embodiment of the present invention is a driving method of a display device including a pixel portion having a plurality of pixels each including a gray scale storage display element in which a signal is inputted to one of terminals and a common potential is supplied to the other of the terminals. In a first initialization period, by scanning signals a plurality of times with respect to the pixel portion, a first gray scale level is displayed on the plurality of gray scale storage display elements included in the pixel portion. In a second initialization period that is subsequent to the first initialization period, by scanning a signal at least once with respect to the pixel portion, a second gray scale level is displayed on the plurality of gray scale storage display elements included in the pixel portion. In a writing period that is subsequent to the second initialization period, an image is formed on the pixel portion by scanning signals a plurality of times with respect to the pixel portion. In the first initialization period, holding periods of the plurality of signals inputted to the one of the terminals of the gray scale storage display element are different.

Further, in addition to the above driving method, a driving method of a display device, in which in the second initialization period, scanning of a signal is performed once on the pixel portion, is also one embodiment of the present invention.

Further, in addition to the above driving method, the following driving method of a display device is also one embodiment of the present invention: a plurality of signals inputted to the one of the terminals of the gray scale storage display element in the first initialization period are each the common potential or a first potential which is different from the common potential; at least one signal inputted to the one of the terminals of the gray scale storage display element in the second initialization period is each a second potential generating an electric field between the second potential and the common potential, which is in a reverse direction of the electric field generated between the first potential and the common potential; and a plurality of signals inputted to the one of the terminals of the gray scale storage display element in the writing period are each the common potential, the first potential, or the second potential.

Furthermore, in addition to the above driving method, the following driving method of a display device is also one embodiment of the present invention: a plurality of signals inputted to the one of the terminals of the gray scale storage display element in the first initialization period are each the common potential or a first potential which is different from the common potential; at least one signal inputted to the one of the terminals of the gray scale storage display element in the second initialization period is each the common potential or a second potential generating an electric field between the second potential and the common potential, which is in a reverse direction of the electric field generated between the first potential and the common potential; a plurality of signals inputted to the one of the terminals of the gray scale storage display element in the writing period are each the common potential, the first potential, or the second potential.

Moreover, in addition to the above driving method, a driving method of a display device, in which at the last scanning of a signal in the writing period, the common potential is inputted to the one of the terminals the gray scale storage display element is also one embodiment of the present invention.

Besides, in addition to the above driving method, when a plurality of signals are scanned x times (x is a natural number which is 2 or more) in a first initialization period and the length of the shortest signal holding period is t, the lengths of holding periods of the plurality of signals are each $2^{y-1}$ t (y is a natural number which is x or less).

Further, in addition to the above driving method, a driving method of a display device, in which the lengths of holding periods of a plurality of signals inputted to the one of the terminals of the gray scale storage display element in a writing period are the same, is also one embodiment of the present invention.

Furthermore, a display device including a control portion for controlling the above driving method; a source driver and a gate driver which are electrically connected to the control portion; a transistor whose gate terminal is electrically connected to the gate driver, first terminal is electrically connected to the source driver, and second terminal is electrically connected to one of terminals of an electrophoresis element; and a capacitor having terminals one of which is electrically connected to the second terminal of the transistor and the other of which is electrically connected to a wiring which supplies a common potential is also one embodiment of the present invention.

In addition, a display device in which an oxide semiconductor is used for a semiconductor layer of the transistor is also one embodiment of the present invention.

Note that in this specification, a gray scale storage display element is an element that can control a display gray scale by voltage application and holds the display gray scale under no voltage application. As an example of the gray scale storage display element, the following elements are given: an element using electrophoresis (an electrophoresis element), a particle rotation element using a twisting ball, a particle movement element using a charged toner or Electronic Liquid Powder (registered trademark), a magnetrophoretic element, which displays a gray scale by magnetism, a moving liquid element, a light-scattering element, a phase change element, and the like.

Note that since a source terminal and a drain terminal of a transistor change depending on the structure, the operating condition, and the like of the transistor, it is difficult to define which is a source terminal or a drain terminal. Therefore, in this document (specification, claims, drawings, and the like), one of a source terminal and a drain terminal is referred to as a first terminal and the other thereof is referred to as a second terminal for distinction.

In a driving method of a display device of an embodiment of the present invention, controlling of a voltage application time or the like can control multi-gray scale display of a gray scale storage display element.

Further, a driving method of a display device of one embodiment of the present invention includes an initialization processing in which when images are switched, the gray scale level of a plurality of gray scale storage display elements included in a pixel portion is converted into a first gray scale level, and sequentially, converted into a second gray scale level. Therefore, images with less residual previous images can be displayed.

Furthermore, in a driving method of a display device of an embodiment of the present invention, the lengths of holding periods of a plurality of signals inputted to the one of the terminals of a gray scale storage display element in the first initialization processing are different. Therefore, the number of times of scanning signals that is needed for voltage application to a plurality of electrophoresis elements displaying different gray scale levels for an appropriate time can be reduced. That is, deterioration of elements included in the display device can be suppressed and power consumption of the display device can be reduced.

BEST MODE FOR CARRYING OUT THE INVENTION

Hereinafter, embodiments of the present invention will be described in detail with reference to the drawings. Note that the present invention is not limited to the description below, and it is easily understood by those skilled in the art that a variety of changes and modifications can be made without departing from the spirit and scope of the present invention. Therefore, the present invention should not be limited to the descriptions of the embodiments below.

Embodiment 1

In this embodiment, one example of a structure and operation of a display device including a gray scale storage display element and the operation thereof is described with reference to FIGS. 1A to 1C, FIG. 2, FIG. 3, FIG. 4, and FIG. 5. Note that in this embodiment, an example where an electrophoresis element is used as a gray scale storage display element is described.

[An Example of a Structure of a Display Device]

Figure 1A:
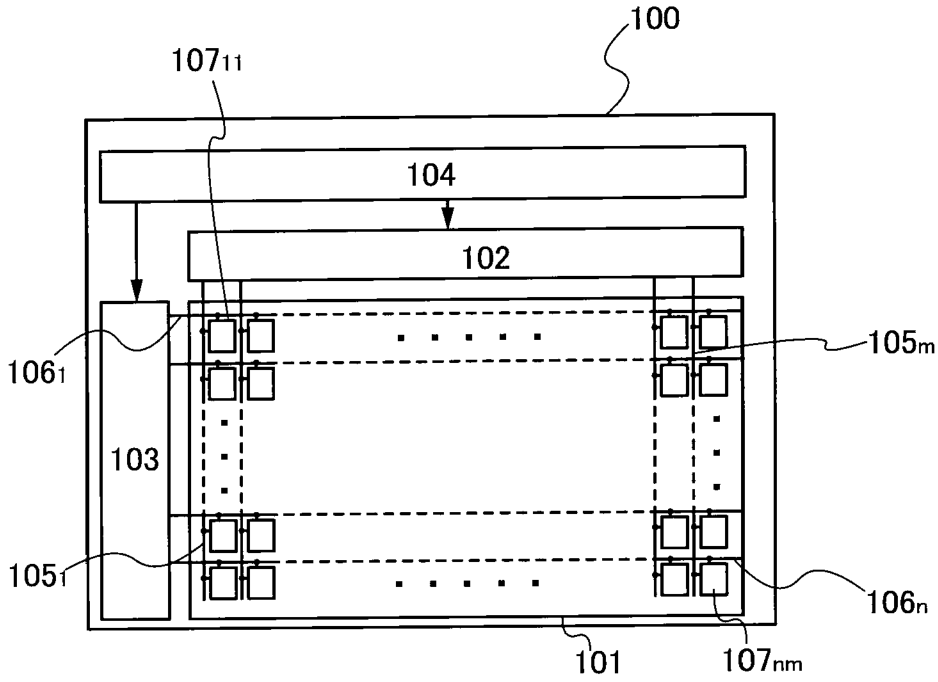
FIG. 1A illustrates one example of a display device.

FIG. 1A illustrates a block diagram of a structure of a display device of this embodiment. A display device 100 includes a pixel portion 101, a source driver 102, a gate driver 103, a control portion 104, m (m is a positive integer) source lines $\mathbf{105}_1$ to $\mathbf{105}_m$ which are provided so as to be parallel to each other, and n (n is a positive integer) gate lines $\mathbf{106}_1$ to $\mathbf{106}_n$ which are provided so as to be parallel to each other. Note that the source driver 102 is electrically connected to the pixel portion 101 through the m source lines $\mathbf{105}_1$ to $\mathbf{105}_m$. The gate driver 103 is electrically connected to the pixel portion 101 through the n gate lines $\mathbf{106}_1$ to $\mathbf{106}_n$. Further, the control portion 104 is electrically connected to the source driver 102 and the gate driver 103.

Further, the pixel portion 101 includes n×m pixels $\mathbf{107}_{11}$ to $\mathbf{107}_{nm}$. Note that the n×m pixels $\mathbf{107}_{11}$ to $\mathbf{107}_{nm}$ are arranged in n rows and m columns. In addition, each of the m source lines $\mathbf{105}_1$ to $\mathbf{105}_m$ is electrically connected to n pixels that are arranged in any of the columns. Each of the n gate lines $\mathbf{106}_1$ to $\mathbf{106}_n$ is electrically connected to m pixels that are arranged in any of the rows. In other words, the pixel $\mathbf{107}_{ij}$ which is arranged in the i-th row and the j-th column (i and j are positive integers) ($1 \le i \le n$ and $1 \le j \le m$) is electrically connected to the source line 105 and the gate line $\mathbf{106}_i$.

Figure 1B:
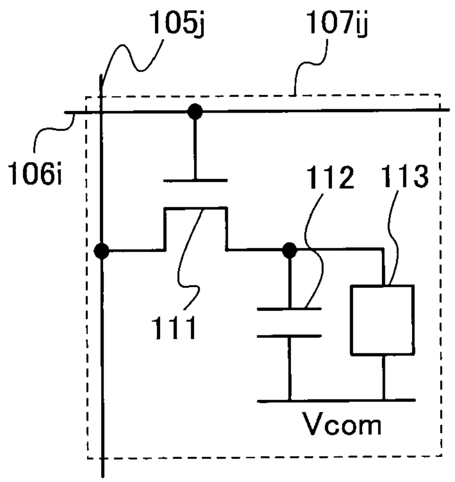
FIG. 1B illustrates one example of a pixel.

FIG. 1B illustrates a circuit diagram of the pixel 107, arranged in i-th row and j-th column. The pixel $\mathbf{107}_{ij}$ includes a transistor 111 whose gate terminal is electrically connected to the i-th gate line $\mathbf{106}_i$ and first terminal is electrically connected to the j-th source line 105; a capacitor 112 having terminals one of which is electrically connected to a second terminal of the transistor 111 and the other of which is electrically connected to a wiring (also referred to as a common potential line) supplying a common potential ($V_{com}$); an electrophoresis element 113 having terminals one of which is electrically connected to the second terminal of the transistor 111 and one of terminals of the capacitor 112 and the other of which is electrically connected to the common potential line. Note that in this embodiment, a ground potential, 0V, or the like can be given as the common potential ($V_{com}$).

Figure 1C:
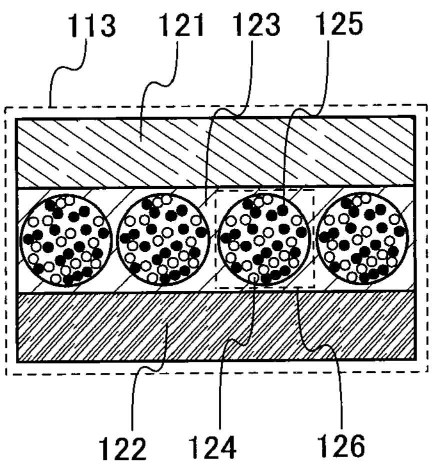
FIG. 1C illustrates one example of a gray scale storage display element.

FIG. 1C illustrates a specific structure example of the electrophoresis element 113. The electrophoresis element 113 illustrated in FIG. 1C includes by an electrode 121, an electrode 122, a layer 123 which includes charged particles and is provided between the electrode 121 and the electrode 122. Note that here, the electrode 121 corresponds to one of terminals of the electrophoresis element 113 in FIG. 1B, and the electrode 122 corresponds to the other of the terminals of the electrophoresis element 113 in FIG. 1B. Further, at least one of the electrodes 121 and 122 is formed using a light-transmitting material. Here, only the electrode 122 is formed using a light-transmitting material. Further, the layer 123 including charged particles has a plurality of microcapsules 126 in each of which a plurality of white particles 124 negatively charged and a plurality of black particles 125 positively charged are sealed. Note that the microcapsules 126 are filled with liquid, whereby the white particles 124 negatively charged and the black particles 125 positively charged can move in the microcapsules 126 by an electric field generated in the layer 123 including charged particles. Furthermore, in the electrophoresis element 113, an insulating layer can be provided between the layer 123 including charged particles and the electrode 121 or the electrode 122.

In the display device 100 of this embodiment, by controlling voltage (an electric field of the layer 123 including charged particles) applied to the electrophoresis element 113, it is possible to gather the white particles 124 to one of the electrodes and to gather the black particles 125 to the other of the electrodes. That is, a color of the electrophoresis element 113 (hereinafter, also referred to as display of the electrophoresis element 113) viewed from the side of the electrode 122 formed of a light-transmitting material can be controlled to be a color between white and black. Thus, images can be displayed in a pixel portion including a plurality of pixels each having the electrophoresis element 113. Specifically, in a display device of this embodiment, a potential higher than that of the other of terminals (the electrode 122) of the electrophoresis element 113 is applied to one of the terminals (the electrode 121) of the electrophoresis element 113, so that display of the electrophoresis element 113 can be made to be black. A potential lower than that of the other of terminals of the electrophoresis element 113 is applied to one of the terminals of the electrophoresis element 113, so that display of the electrophoresis element 113 can be made to be white.

Moreover, a display of the electrophoresis element 113 in the display device 100 of this embodiment is not limited to white and black (need not be binarized) and multi-gray scale display can be performed. For example, at least one intermediate color (gray) between white and black can be displayed. That is, multi-gray scale display can be performed by controlling the amount of the white particles 124 and the moved black particles 125 which move in the electrophoresis element 113 by a factor such as a value of application voltage and time. Note that controlling the factor is important in that multi-gray scale display can be performed in the display device and deterioration of a display image of the display device over time is suppressed.

[An Operation Example of the Display Device]

The operation of the display device 100 of this embodiment in displaying images will be described below. Here, in convenience, the purest white color of the display device is defined as a gray scale level 1 (white), the deepest black color of the display device is defined as a gray scale level 8 (black), and intermediate colors between white and black are defined as gray scale levels 2 to 7.

The other of the terminals of the electrophoresis element 113 included in the display device 100 of this embodiment is electrically connected to the common potential line. Therefore, display of the electrophoresis element 113 can be controlled by a potential supplied to the one of the terminals of the electrophoresis element 113. Further, the potential of the one of the terminals of the electrophoresis element 113 is controlled by a signal inputted from the source driver 102 through the transistor 111. Note that here, the source driver 102 can set the potential of the source line $\mathbf{105}_j$ to be a potential ($V_H$) higher than the common potential ($V_{com}$), the same potential of the common potential ($V_{com}$), or a potential ($V_L$) lower than the common potential ($V_{com}$).

That is, the source driver 102 supplies the potential ($V_H$) to the one of the terminals (the electrode 121) of the electrophoresis element 113, so that an electric field in the direction from the electrode 121 to the electrode 122 is generated in the layer 123 including charged particles. Therefore, the gray scale level displayed by the electrophoresis element 113 can be the gray scale level 8 (black) or a gray scale level which is close to the gray scale level 8 (black). In a similar manner, the potential ($V_L$) is supplied to the one of the terminals (the electrode 121) of the electrophoresis element 113, so that an electric field in the direction from the electrode 122 to the electrode 121 is generated in the layer 123 including charged particles. Therefore, the gray scale level displayed by the electrophoresis element 113 can be the gray scale level 1 (white) or a gray scale level which is close to the gray scale level 1 (white). Note that the gray scale displayed by the electrophoresis element 113 can be controlled by the strength of an electric field and the length of time of electric field generation.

Here, description is made as follows in convenience: in the case where time for one scanning of a signal with respect to the pixel portion 101 is defined as t; the gray scale level is increased by one when the potential ($V_H$) is supplied to the one of the terminals of the electrophoresis element 113 during a period t, and the gray scale level is decreased by one when the potential ($V_L$) is supplied to the one of the terminals of the electrophoresis element 113 during the period t.

Further, the same potential of the common potential ($V_{com}$) is supplied to the one of the terminals (the electrode 121) of the electrophoresis element 113, so that an electric field is not generated in the layer 123 including charged particles. Therefore, a gray scale level that the electrophoresis element 113 displays before the same potential is supplied can be kept.

Next, each period of the display device 100 of this embodiment will be described with reference to FIG. 2 and FIG. 3.

The usage of the display device 100 of this embodiment includes a switching period for rewriting an image and a display period for displaying an image. Note that in the display device 100, scanning of signals is performed a plurality of times on the pixel portion 101 in the switching period while scanning of a signal is not performed on the pixel portion 101 in the display period.

Note that, in the display device 100 of this embodiment, for example, scanning of a signal corresponds to operation from when the gate line $\mathbf{106}_1$ in the first row is selected and the transistor 111 included in each of pixels $\mathbf{107}_{11}$ to $\mathbf{107}_{1m}$, arranged in the first row is turned on, so that the signal is inputted from the source driver 102 to the one of the terminals (the electrode 121) of the electrophoresis element 113 included in the pixel $\mathbf{107}_{11}$ in the first row and the first column, to when the gate line $\mathbf{106}_n$ in the n-th row is selected and the transistor 111 included in each of pixels $\mathbf{107}_{n1}$ to $\mathbf{107}_{nm}$ arranged in the n-th row is turned on, so that the signal is inputted from the source driver 102 to the one of the terminals (the electrode 121) of the electrophoresis element 113 included in the pixel $\mathbf{107}_{nm}$ in the n-th row and the m-th column. The operation can be referred to as one scanning of a signal.

Further, the switching period is divided into an initialization period for an initialization processing of the pixel portion 101 and a writing period for inputting image data to the pixel portion 101. Moreover, the initialization period is divided into a first initialization period in which the electrophoresis element 113 is made to display the gray scale level 8 (black), and a second initialization period in which the electrophoresis element 113 is made to display the gray scale level 1 (white).

In this specification, the processing in which the gray scale level 8 (black) is displayed (a first initialization processing) and sequentially the gray scale level 1 (white) is displayed (a second initialization processing) is referred to as an initialization processing. Note that the initialization processing enables the display device 100 to reduce residual images. Therefore, the initialization processing is important for enhancement of display quality of the display device 100.

[The First Initialization Processing]

In the display device 100 of this embodiment, the one of the terminals of the electrophoresis element 113 may be controlled in the first initialization period so that the potential ($V_H$) is supplied thereto. Thus, display of the electrophoresis element 113 in which various gray scale levels are displayed is converted into the gray scale level 8 (black).

Note that a problem will occur when the potentials ($V_H$) are equally supplied to the one of the terminals of the plurality of electrophoresis element 113 included in the pixel portion 101. In other words, a problem will occur when a particular electric field is generated for the same period with respect to all of the plurality of electrophoresis elements 113 provided in the pixel portion 101.

The reason is described below. An image is already displayed on the pixel portion 101. That is, in the pixel portion 101, the electrophoresis element 113 which displays the gray scale level 1 (white), the electrophoresis element 113 which displays the gray scale level 8 (black), and the electrophoresis elements 113 which display the gray scales 2 to 7 are randomly exists. The first initialization processing need not be similarly performed on the electrophoresis element 113 which displays the gray scale level 1 (white) and the electrophoresis element 113 which displays the gray scale level 8 (black) among them. In other words, it is a waste of power to supply a surplus potential ($V_H$) to the electrophoresis element 113 which displays the gray scale level 8 (black). Here, the electrophoresis element 113 which displays the gray scale level 1 (white) and the electrophoresis element 113 which displays the gray scale level 8 (black) are compared. However, a problem will also occur when the first initialization processing is performed uniformly on the electrophoresis elements 113 which display different gray scale levels. Therefore, it is preferable that the first initialization processing be separately performed on each of the plurality of electrophoresis elements 113 considering gray scale levels which the electrophoresis elements 113 display in a previous display period. Specifically, it is preferable to control the display device as follows: the potential ($V_H$) is applied to one of the terminals of the electrophoresis element 113 which displays a gray scale level close to the gray scale level 8 (black) for a short time, and the potential ($V_H$) is applied to one of the terminals of the electrophoresis element 113 which displays the gray scale level 1 (white) or a gray scale level close to the gray scale level 1 (white) for a long time.

Figure 2:
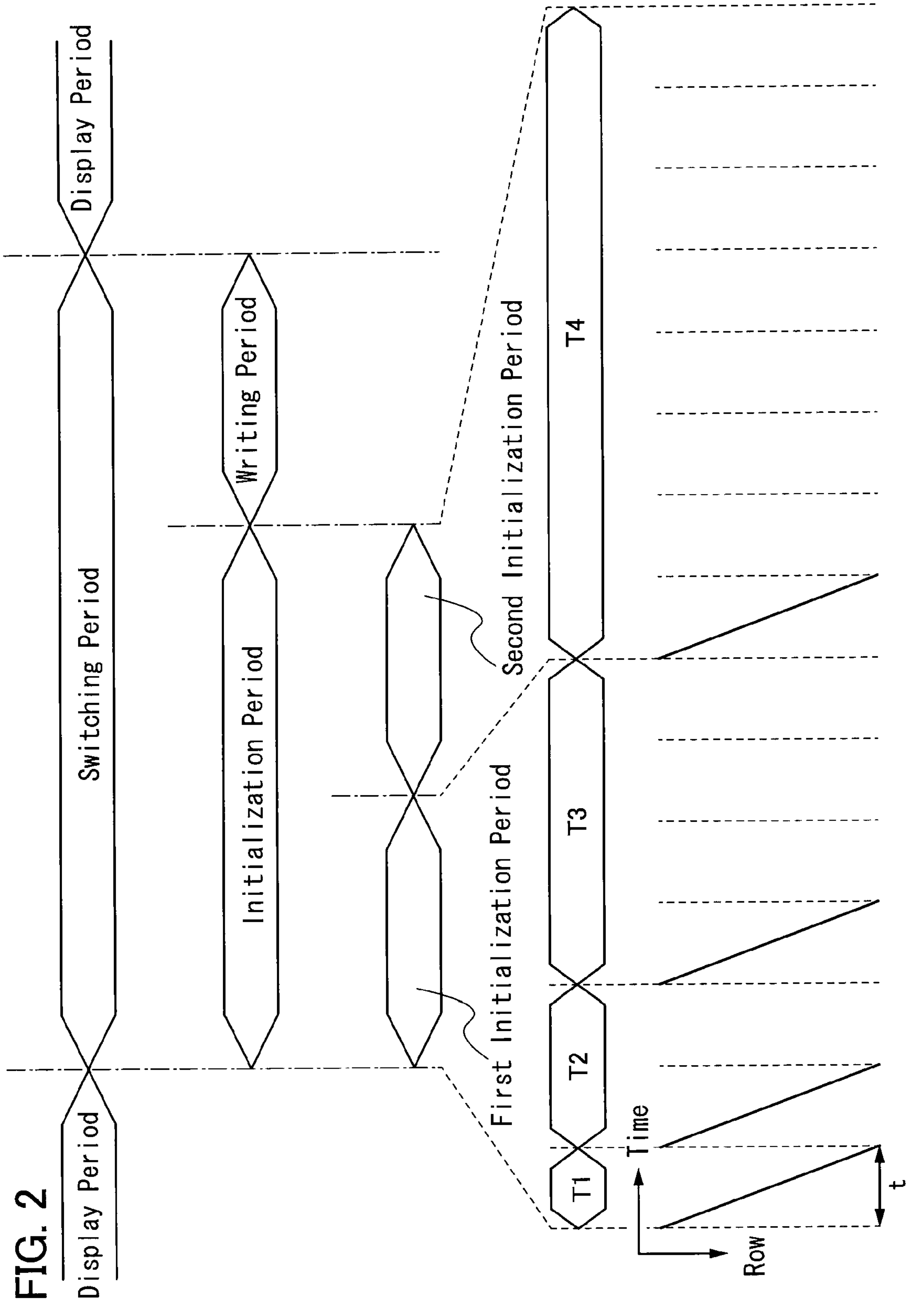
FIG. 2 illustrates one example of scanning signals in an initialization period.

FIG. 2 illustrates scanning of signals in the initialization period of the electrophoresis element 113. In the display device 100 of this embodiment, a potential of each of the electrophoresis elements 113 is controlled by a time gray scale method in the first initialization period. Note that the time gray scale method is a method by which a gray scale is controlled by controlling a time for voltage application to the electrophoresis elements 113: the method by which a voltage applied to each of the electrophoresis elements 113 is controlled in each of periods formed by further division of the first initialization period.

Further, in this embodiment, the weighting of each period is performed (time of the periods is varied) as illustrated in FIG. 2 in addition to division of the first initialization period. FIG. 2 illustrates the case where the first initialization period is divided into a first period (T1), a second period (T2), and third period (T3) and the weighting is performed so that T1:T2:T3=1:2:4 is satisfied, for example. Note that in the diagram, t represents time needed for one scanning of a signal of the display device 100 of this embodiment. As illustrated in FIG. 2, time for application of an appropriate voltage can be controlled in eight ways (the case where a voltage application time is 0 is included) with three scanning of signals by the weighting of a holding period (the interval from when a signal is inputted to the one of the terminals of the electrophoresis element 113 to when a next signal is inputted) of each signal.

As thus described, a voltage can be applied to each of the electrophoresis elements 113 which performs multi-gray scale display for an appropriate time by controlling a voltage applied to the electrophoresis element 113 in the first initialization period by performing weighting. In addition, the number of times of scanning of signals is decreased, so that reduction in power consumption can be realized. It is particularly preferable that weighting of holding periods of signals be performed as shown in FIG. 2. That is, it is preferable that when scanning of signals be performed x (x is a natural number which is 2 or more) times, weighting be performed so that holding periods vary like, t, 2t, 4t, . . . $2^{x-1}$t. That is because, by thus performing weighting, voltage application time in which a minimum unit is t can be controlled by the minimum number of scanning of signals.

[The Second Initialization Processing]

The display device 100 of this embodiment is controlled so that the potential ($V_L$) is supplied to the one of the terminals of the electrophoresis element 113 in the second initialization period. Thus, the gray scale level displayed by the electrophoresis element 113 which displays the gray scale level 8 (black) are performed is converted into the gray scale level 1 (white).

Note that in the second initialization period, the same potential can be supplied to the plurality of electrophoresis elements 113 in the pixel portion 101. That is because in the first initialization period, the gray scale level of all of the plurality of electrophoresis elements 113 included in the pixel portion 101 is converted into the gray scale level 8 (black).

FIG. 2 illustrates scanning of signals of the electrophoresis element 113 in the initialization period. In the display device 100 of this embodiment, scanning of the signal as the second initialization processing is performed only once at the beginning of the period. The potential ($V_L$) is supplied to the one of the terminals of the electrophoresis element 113 in the pixel portion 101, whereby the gray scale level which each of the electrophoresis element 113 displays is converted from the gray scale level 8 (black) into the gray scale level 1 (white) over time. Note that since the gray scale level 8 (black) is converted into the gray scale level 1 (white), the length of the second initialization period needs to be at least 7t or more.

Further, when the length of the second initialization period is 8t as illustrated in FIG. 2 and the period is shown as the fourth period (T4), it can be expressed that weighting of the whole initialization period is performed so that T1:T2:T3:T4=1:2:4:8 is satisfied.

As thus described, residual images occurring in display images can be reduced by the initialization processing. In addition, in the above initialization processing, the number of times of scanning of signals is reduced by the weighting of the holding periods of signals.

Note that in the display device 100, capacitance of the capacitor 112 provided for the pixel 107 needs to be large in order to make possible for a display period to be longer. Thus, a current supply capability of the transistor 111 provided for the pixel portion 101 needs to be large. Specifically, the size of a transistor needs to be large. As a result, the load of the source driver 102 supplying charges for the capacitor 112 and the load of the gate driver 103 controlling switching of the transistor 111 are increased. Accordingly, elements such as a transistor, which form the source driver and the gate driver 103, are deteriorated, which is problematic. In contrast, it is possible to suppress the deterioration of the elements such as a transistor by reduction of the number of times of scanning of signals in the initialization period as described above.

[Forming of an Image]

In the display device 100 of this embodiment, the potential ($V_H$), the potential ($V_L$), and the potential ($V_{com}$) are selectively supplied to the one of the terminals of the electrophoresis element 113 in the writing period so as to control a display gray scale of the electrophoresis element 113. Here, in convenience, the potential ($V_H$) is supplied to the one of the terminals of the electrophoresis element 113 for t (time needed for one scanning of a signal), so that the display gray scale level of the electrophoresis element 113 is converted by one (e.g., the gray scale level 1 (white) is converted into the gray scale 2). Therefore, by a time gray scale method in which the writing period has 7t, the display gray scale level of the electrophoresis element 113 can be appropriately set to be the gray scale level 1 (white) to the gray scale level 8 (black). Further, the display gray scale of the electrophoresis element 113 included in each pixel 107 is controlled, so that an image can be formed on the pixel portion 101.

Note that it is preferable that weighting be not performed on the holding period of a signal in the writing period though it is possible to perform weighting as in the initialization period. That is because the display gray scale level of the electrophoresis element 113 can be accurately displayed by considering not only time for voltage application to the electrophoresis element 113 but also the order of applied voltages in the writing period.

Further, scanning of signals to the pixel portion 101 is not performed in a display period after the writing period. That is, the signal inputted to the pixel portion 101 at the end of the writing period decides the state in the display period. Therefore, it is preferable that the common potential ($V_{com}$) be supplied to all of the one of the terminals of the electrophoresis elements 113 in the pixel portion 101 at the end of the writing period, and a voltage be controlled not to be applied to the electrophoresis element 113 in the display period. That is because a preferable display gray scale level is converted in the state where a voltage is applied to the electrophoresis element 113, or the electrophoresis element 113 is possibly deteriorated by long-time application of a constant voltage.

Figure 3:
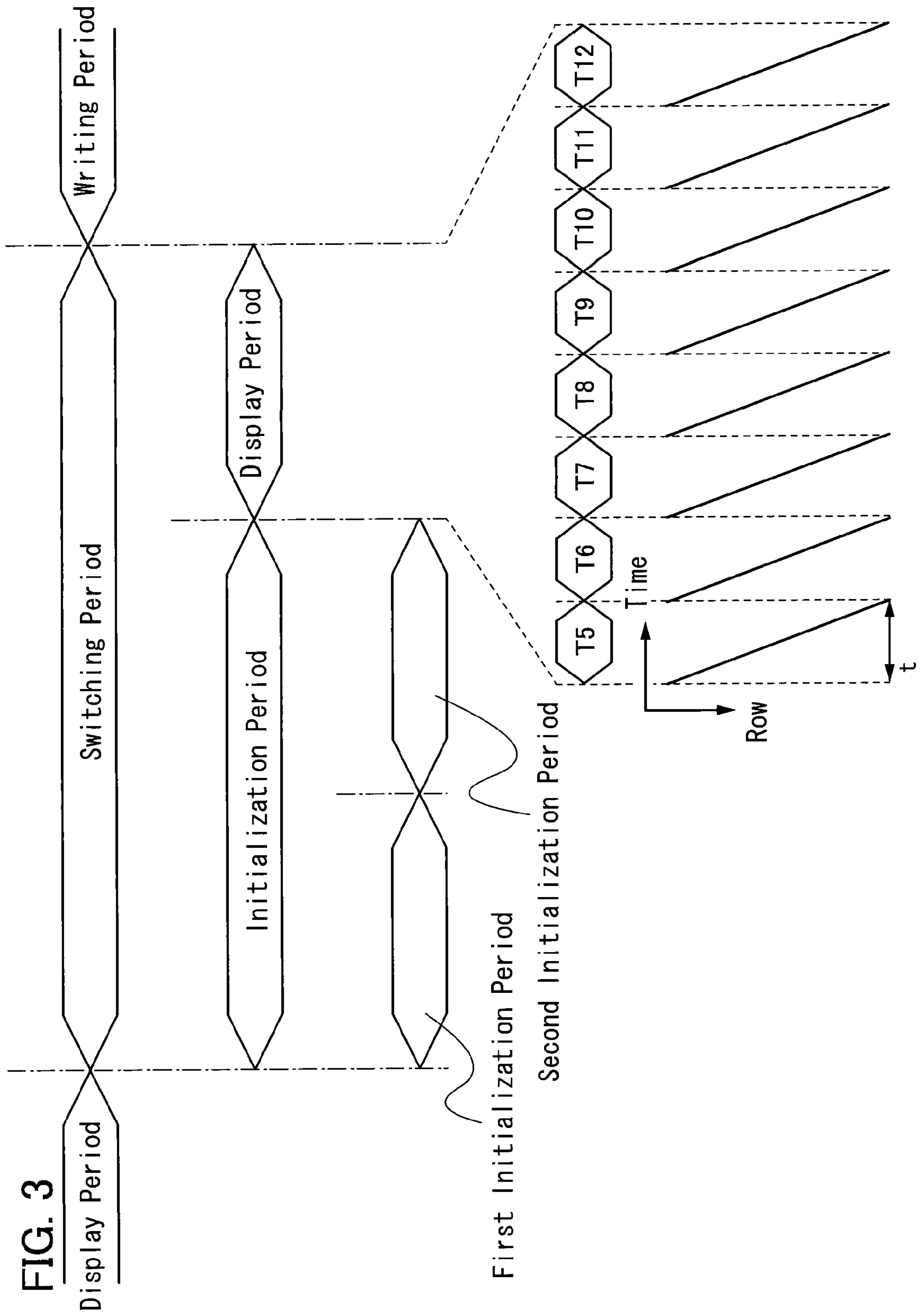
FIG. 3 illustrates one example of scanning signals in a writing period.

As the above description is considered, FIG. 3 illustrates an example of the case where the writing period is divided into a fifth period (T5) to a twelfth period (T12), and further, such a period shown as t. Note that it is also explained that the writing period includes a gray scale control period using the period of 7t, the common potential ($V_{com}$) input period using the period of t.

A Specific Example

Figure 4:
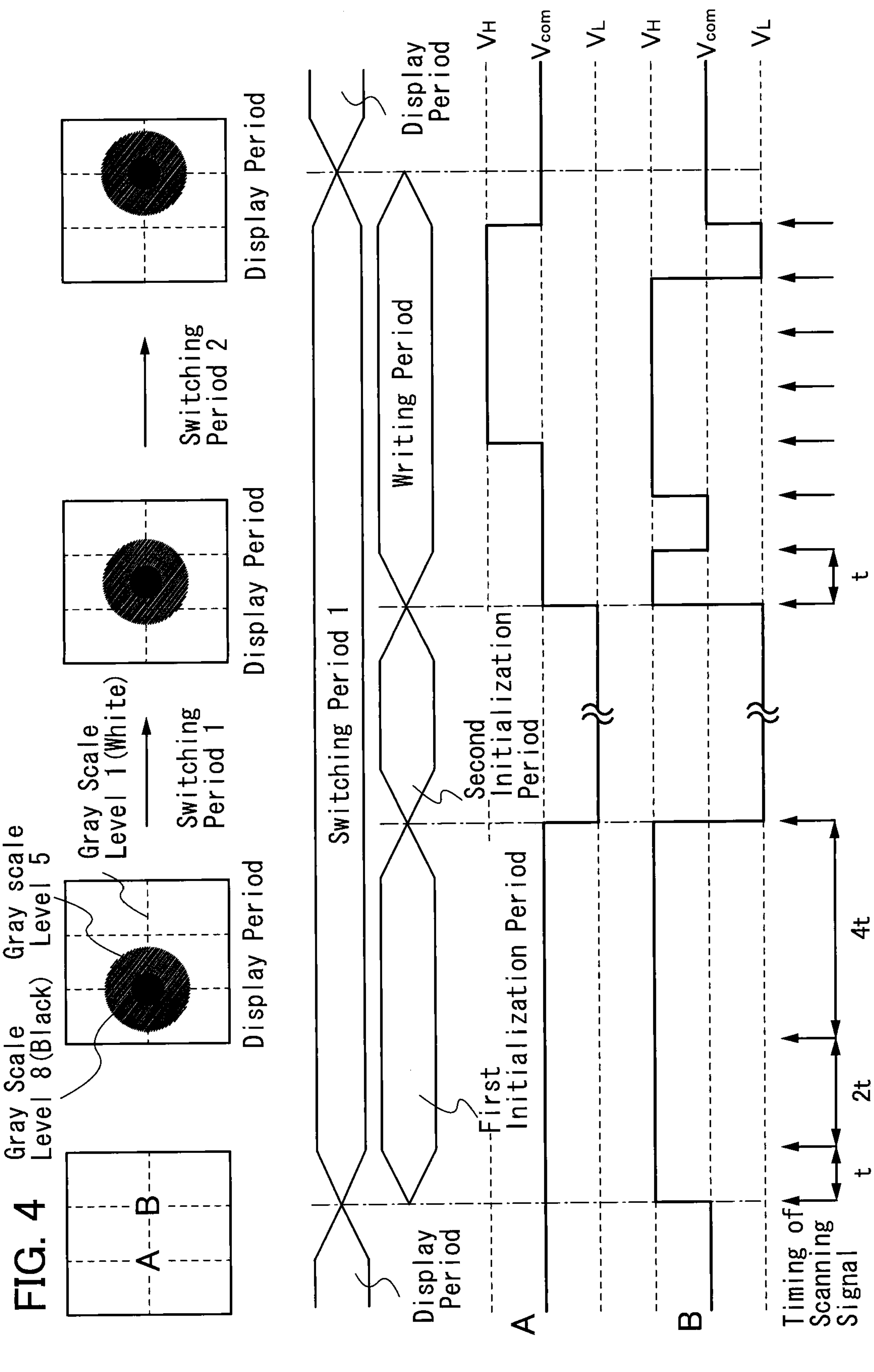
FIG. 4 illustrates a specific example of a signal inputted to a pixel in a switching period.
Figure 5:
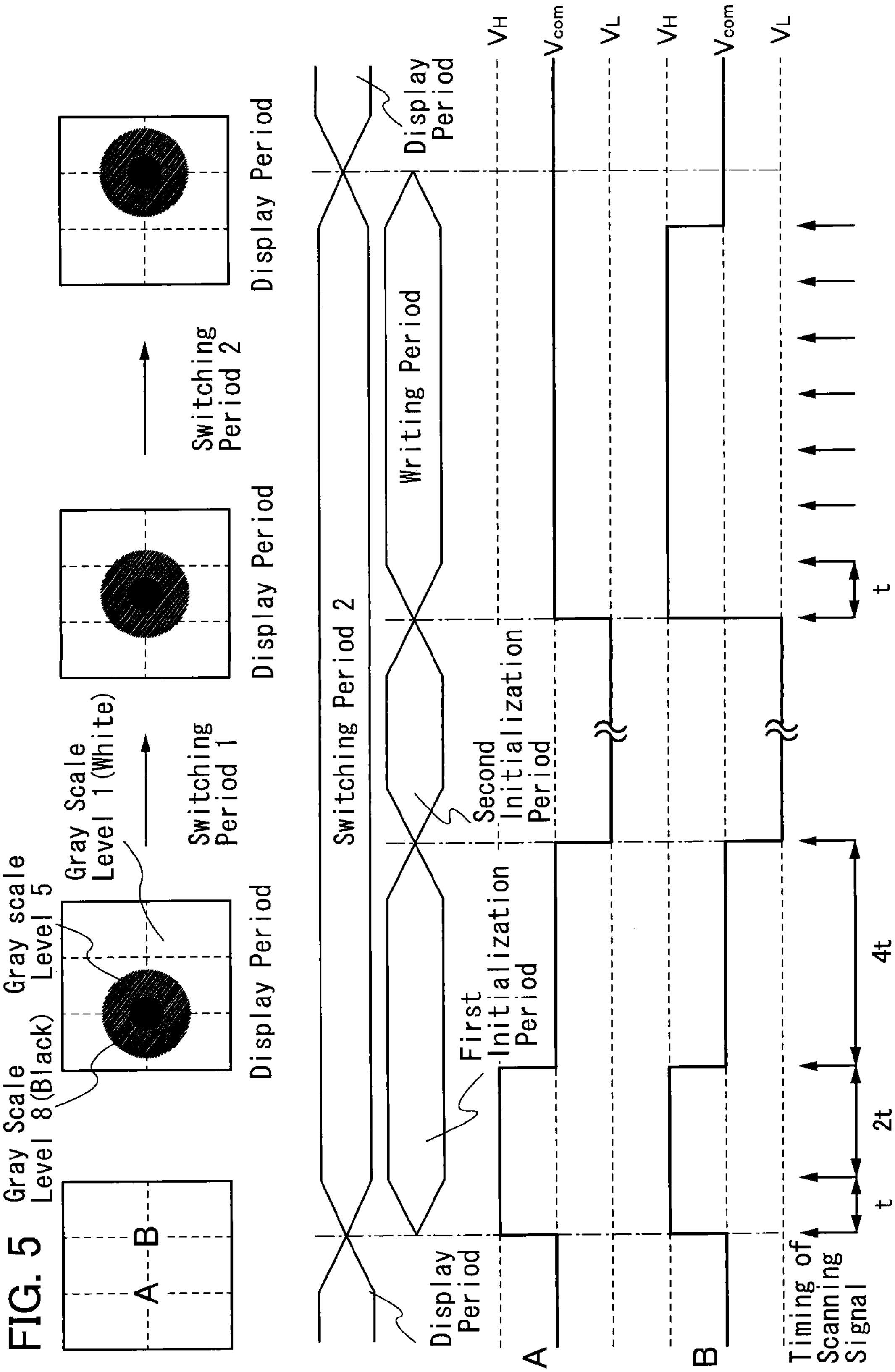
FIG. 5 illustrates a specific example of a signal inputted to a pixel in a switching period.

Operation of the display device in the switching period will be described with reference to FIG. 4 and FIG. 5. Specifically, the following case will be explained: an image (a first image) of a circle displayed at the gray scale level 5 and a circle displayed at the gray scale level 8 (black) therein, on which is displayed the background displayed at the gray scale level 1 (white), is changed into an image (a second image) of these circles moved from the left side to the center, and further, the second image is changed into an image (a third image) of these circles moved from the center to the right side.

Note that a switching period in which the first image is changed into the second image is a switching period 1, and a switching period in which the second image is changed into the third image is a switching period 2. Further, a pixel on the center of the circle displayed at the gray scale level 5 in the first image is a pixel A, and a pixel on the center of the circle displayed at the gray scale level 5 in the third image is a pixel B.

In addition, from the source driver, the common potential ($V_{com}$), the higher potential ($V_H$) than the common potential ($V_{com}$), and the lower potential ($V_L$) than the common potential ($V_{com}$) can be outputted to the one of the terminals of the electrophoresis element 113 included in each pixel.

First, scanning of signal in the switching period 1 and a signal inputted to the pixel A and the pixel B are described with reference to FIG. 4.

When a switching signal for switching from the first image to the second image is inputted from a control portion to a source driver and a gate driver, the first initialization period is performed in accordance with the gray scale level displayed on each pixel. Here, scanning of signals is performed three times in the first initialization period. The interval (a holding period of a first signal) between a first scanning of a signal and a second scanning of a signal is t. The interval (a holding period of a second signal) between a second scanning of a signal and a third scanning of a signal is 2t. The interval (a holding period of a third signal) between a third scanning of a signal and the end of the first initialization period (the beginning of the second initialization period) is 4t. That is, the first initialization period is divided by the weighting of holding periods of signals. Therefore, scanning of signals is performed three times on pixels, which are provided for a pixel portion randomly and display in eight gray scale levels, so that the gray scale levels of all of the pixels in the pixel portion can be converted to the gray scale level 8 (black) by voltage application for an appropriate time. Specifically, all of the first to third signals supplied to the pixel A displaying the gray scale level 8 (black) is the common potential ($V_{com}$), and all of the first to third signals supplied to the pixel B displaying the gray scale level 1 (white) is the potential ($V_H$), so that the display of the pixel A and the pixel B can be the gray scale level 8 (black).

Sequentially, the second initialization processing is performed. Here, scanning of a signal is performed once in the second initialization processing. The potential ($V_L$) is equally inputted to each pixel. Further, the length of the second initialization period is set to be at least 7t or more to change displays of all of the pixels into the gray scale level 1 (white).

Next, the second image is formed. Here, scanning of signal is performed eight times in the writing period. Input signals are separately inputted to all of the pixels. Note that the weighting of holding periods of each signal is not performed and the interval of scanning of the signal is equally t. The pixel A and the pixel B in the second image perform a display at the gray scale level 5. Therefore, in the writing period, an input signal may be appropriately controlled so as to be (a period for inputting the potential ($V_H$))−(a period for inputting the potential ($V_L$))=4t. It is preferable that the specific kind of signals to be inputted in order to display the gray scale level to be obtained be appropriately set because the signal is determined on the basis of characteristics of a charged particle in an electrophoresis element or the order of applied voltages in the writing period. For example, it is preferable that the potential ($V_L$) be inputted after the surplus potential ($V_H$) as an input signal to a pixel B is inputted, because the localization of charges in a layer with a charged particle included in the electrophoresis element can be suppressed. Further, it is preferable that in scanning of the last signal in the writing period, the common potential ($V_{com}$) be inputted to all of the pixels and a voltage be not applied to the electrophoresis element in a display period of the second image.

In this manner, switching from the first image to the second image is completed. Here, in the display period of the second image, a signal is not inputted to the pixel A and the pixel B. Further, the potential of the one of the terminals of the electrophoresis element included in the pixel A and the pixel B holds the same potential as the common potential ($V_{com}$) and a voltage is applied to the electrophoresis element (an electric field is not generated in the layer including charged particles). Therefore, a display of the second image can be held. Note that the second image can be held until a switching signal for switching to the sequential third image is inputted from the control portion to the source driver and the gate driver.

Then, scanning of signal in the switching period 2 and a signal inputted to the pixel A and the pixel B are described with reference to FIG. 5.

When a switching signal for switching from the second image to the third image is inputted from a control portion to a source driver and a gate driver, the first initialization period is performed in accordance with the gray scale level displayed on each pixel. Here, scanning of signals is performed three times in the first initialization period. The interval (the holding period of the first signal) between the first scanning of a signal and the second scanning of a signal is t. The interval (the holding period of the second signal) between the second scanning of a signal and the third scanning of a signal is 2t. The interval (the holding period of the third signal) between the third scanning of the signal and the end of the first initialization period (the beginning of the second initialization period) is 4t. That is, the first initialization period is divided by the weighting of holding periods of signals. Therefore, scanning of signals is performed three times on pixels, which are provided for a pixel portion randomly and display in eight gray scale levels, so that the gray scale levels of all of the pixels in the pixel portion can be converted into the gray scale level 8 (black) by voltage application for an appropriate time. Specifically, the potential ($V_H$) as the first and the third signals and the common potential ($V_{com}$) as the third signal are supplied to the pixel A and the pixel B displaying the gray scale level 5, so that the display of the pixel A and the pixel B can be the gray scale level 8 (black).

Sequentially, the second initialization processing is performed. Here, scanning of a signal is performed once in the second initialization processing. The potential ($V_L$) is equally inputted to each pixel. Further, the length of the second initialization period is set to be at least 7t or more to change displays of all of the pixels into the gray scale level 1 (white).

Next, the third image is formed. Here, scanning of signals is performed eight times in the writing period. Input signals are separately inputted to all of the pixels. Note that the weighting of holding periods of each signal is not performed and the interval of scanning of the signal is equally t. The pixel A in the third image performs a display at the gray scale level 1 (white). Therefore, in the writing period, an input signal may be appropriately controlled so as to be (a period for inputting the potential ($V_H$))−(a period for inputting the potential ($V_L$))=0. Note that here, the case where all of the eight input signals to the pixel A is the common potential ($V_{com}$) is described, for example. The pixel B in the third image performs a display at the gray scale level 8 (black). Therefore, in the writing period, an input signal may be appropriately controlled so as to be (a period for inputting the potential ($V_H$))−(a period for inputting the potential ($V_L$))=7t. Note that since the writing period is 8t here, the gray scale level 8 (black) cannot be freely displayed. However, it is preferable that the writing period be longer because a signal can be appropriately selected for displaying the gray scale level 8 (black). Further, it is preferable that in scanning of the last signal in the writing period, the common potential ($V_{com}$) be inputted to all of the pixels and a voltage be not applied to the electrophoresis element in a display period of the third image.

In this manner, switching from the second image to the third image is completed.

Modification Example

The above display device is one example of an embodiment. This embodiment includes a display device having features that are not described above.

For example, a display device with the electrophoresis element that can display the eight gray scale levels (the gray scale level 1 (white) to the gray scale level 8 (black)) is described above, but a display device that can display higher gray scales or lower gray scales can also be used. Further, white particles negatively charged and black particles positively charged are used as an example of charged particles included in the electrophoresis element, but it is also acceptable that white particles are positively charged and black particles are negatively charged or that particles with colors except the two colors (white and black). Furthermore, a structure in which a kind of charged particle and colored liquid are sealed in a microcapsule and a gray scale is displayed by movement of the charged particle may be employed.

Moreover, in the above display device, the relationship between a voltage application time and the gray scale level displayed by the electrophoresis element is simplified in convenience, but it is possible that the relationship is complicated depending on a display device. In other words, it is assumed that a linear relationship between a voltage application time and the gray scale level displayed by the electrophoresis element, but the relationship is possibly a non-liner relationship. In such a case, the weighting of holding period of a signal can be appropriately determined, and the holding periods are not determined so as to be a multiple of two.

Further, in the above display device, it is assumed that the gray scale level of the electrophoresis element is not converted but held in the display period. However, a display image is possibly deteriorated over time when the holding period of an image becomes longer. For example, even when a voltage is not applied between a pair of electrodes of the electrophoresis element displaying the gray scale level 8

(black), black particles positively charged and white particles negatively charged are not equally provided in a microcapsule included in the electrophoresis element displaying the gray scale level 8 (black). Thus, it is possible that the electric field is generated in the microcapsule and the display gray scale level is converted from the inputted gray scale level in an image writing period. In such a case, in the first initialization period, the potential ($V_H$) can be inputted to the electrophoresis element to which for performing a display of the gray scale level 8 (black), a signal is inputted in the previous writing period.

In addition, in the above display device, weighting is performed so as to make holding periods of a signal sequentially longer in the first initialization period. However, it is possible to perform weighting so as to make holding periods of a signal sequentially shorter or to perform weighting so as to make holding periods of a signal randomly changed.

Further, in the above display device, scanning of a signal is performed only once in the second initialization period. However, it is possible that the gray scale level of the electrophoresis element cannot be converted into the gray scale level 1 (white) when the second initialization period becomes longer or the pixel portion of the display device has high definition. For example, a first signal inputted at the beginning of the second initialization period possibly leaks through a transistor before a conversion of the gray scale level of the electrophoresis element is completed. Furthermore, such a leakage becomes more serious when the size of the capacitor is small by high definition of the pixel portion of the display device. In such a case, the potential ($V_L$) can be inputted a plurality of times to the electrophoresis element in the second initialization period. Note that in the case where scanning of signals is performed a plurality of times in the second initialization period, the weighting of holding periods may be performed as the first initialization period or the length of each holding period of a signal may be the same. Further, it is acceptable that at least one signal of signals inputted a plurality of times is the common potential ($V_{com}$).

In addition, in this embodiment, an electrophoresis element is used as an example of a gray scale storage display element. However, a driving method described in this embodiment is not limited to a display device including the electrophoresis element. In other words, the driving method described in this embodiment can be employed to a display device including an element (a gray scale storage display element) which can control a display gray scale level by voltage application and can hold the display gray scale level without voltage application. For example, the driving method of this embodiment can be employed to a display device in which a display is performed by controlling the orientation of a twisting ball colored black and white by voltage application, a display device in which a display is performed by using Electronic Liquid Powder (registered trademark), or the like.

Note that the whole of or part of contents described in this embodiment can be combined with any of the whole of or part of contents described in any of the other embodiments.

Embodiment 2

In this embodiment, one example of the display device in Embodiment 1 will be described. Specifically, a structure of a pixel in a pixel portion is described with reference to FIGS. 6A and 6B. Note that, for example, an electrophoresis element is used as a gray scale storage display element in this embodiment.

Figure 6A:
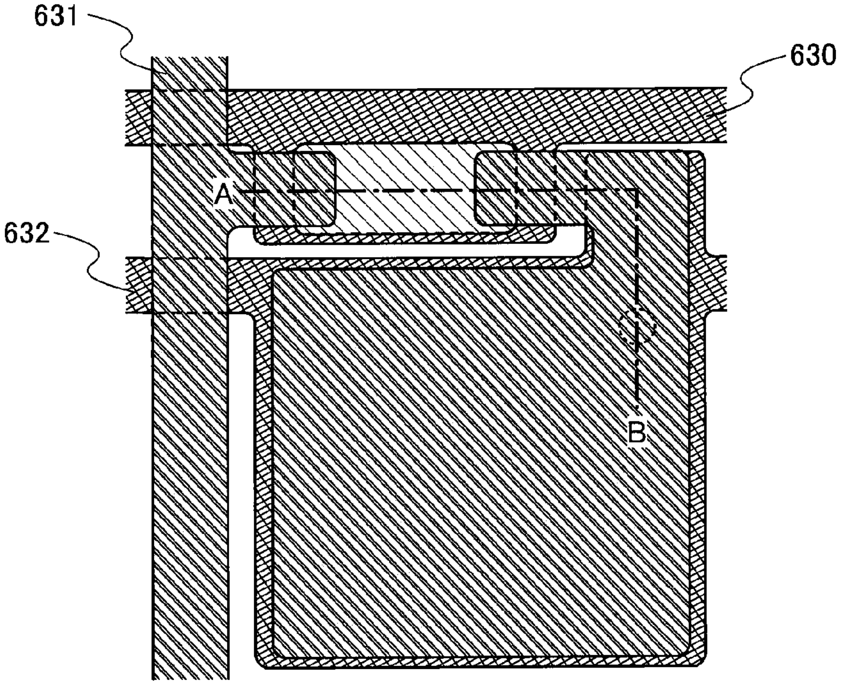
FIG. 6A illustrates one example of a top view of a pixel of a display device.
Figure 6B:
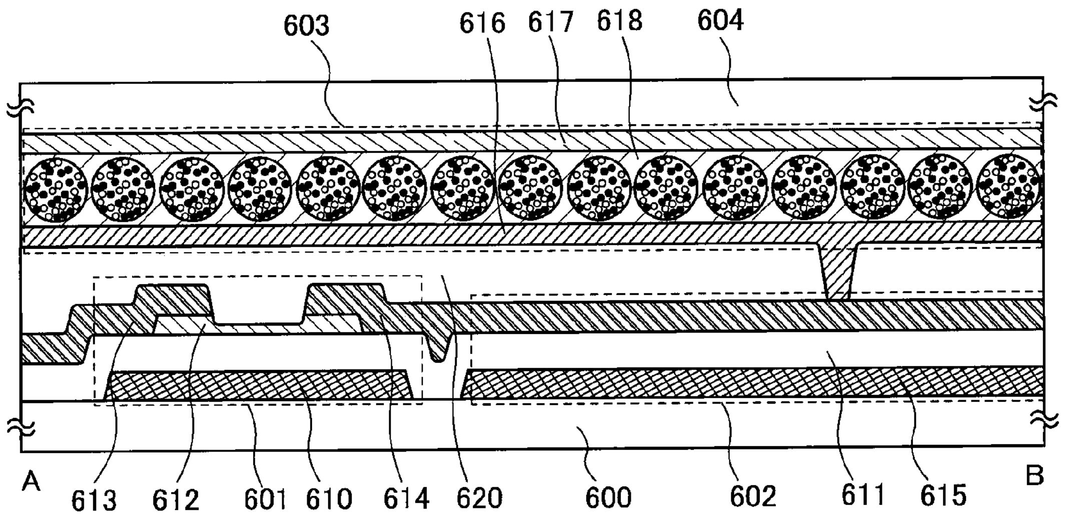
FIG. 6B is one example of a cross sectional view of the pixel of the display device.

FIG. 6A is a top view of a pixel of this embodiment and FIG. 6B is a cross-sectional view taken along line A-B in FIG. 6A. A display device in FIGS. 6A and 6B includes a substrate 600, a thin film transistor 601 and a capacitor 602 provided over the substrate 600, an electrophoresis element 603 provided over the thin film transistor 601 and the capacitor 602, and a substrate 604 provided over the electrophoresis element 603. Note that the electrophoresis element 603 is omitted in FIG. 6A.

The thin film transistor 601 includes a conductive layer 610 electrically connected to a gate line 630, an insulating layer 611 provided over the conductive layer 610, a semiconductor layer 612 provided over the insulating layer 611, a conductive layer 613 provided over the semiconductor layer 612 and electrically connected to a source line 631, and a conductive layer 614. Note that the conductive layer 610 functions as a gate terminal of the thin film transistor 601, the insulating layer 611 functions as a gate insulating layer of the thin film transistor 601, the conductive layer 613 functions as a first terminal of the thin film transistor 601, and the conductive layer 614 functions as a second terminal of the thin film transistor 601. In addition, it can be expressed that the conductive layer 610 is a part of the gate line 630 and the conductive layer 613 is a part of the source line 631.

The capacitor 602 includes the conductive layer 614, the insulating layer 611, and a conductive layer 615 electrically connected to a common potential line 632. Note that the conductive layer 614 functions as one of terminals of the capacitor 602, the insulating layer 611 functions as a dielectric, and the conductive layer 615 functions as the other of the terminals of the capacitor 602. Further, it can be expressed that the conductive layer 615 is part of the common potential line 632.

The electrophoresis element 603 includes a pixel electrode 616 electrically connected to the conductive layer 614 in an opening portion provided in an insulating layer 620, a counter electrode 617 to which the same potential as the conductive layer 615 is applied, and a layer 618 which includes a charged particle and is provided between the pixel electrode 616 and the counter electrode 617. Note that the pixel electrode 616 functions as one of terminals of the electrophoresis element 603, and the counter electrode 617 functions as the other of the terminals of the electrophoresis element 603.

As described in Embodiment 1, a display device of this embodiment can control movement of charged particle dispersed in the layer 618 including charged particles by controlling a voltage applied to the layer 618 including charged particles. In addition, the counter electrode 617 and the substrate 604 have a light-transmitting property in the display device of this embodiment. That is, the display device of this embodiment is a reflective display device in which a display surface is on the substrate 604 side.

Materials which are applicable for each component of the display device of this embodiment are given below.

As the substrate 600, a semiconductor substrate (e.g., a single crystalline substrate and a silicon substrate), an SOI substrate, a glass substrate, a quartz substrate, a conductive substrate provided with an insulating layer on a surface, or a flexible substrate such as a plastic substrate, an attachment film, paper including a fibrous material, and a base material film. As an example of a glass substrate, a barium borosilicate glass substrate, an aluminoborosilicate glass substrate, soda lime glass substrate, or the like can be given. For a flexible substrate, a flexible synthetic resin such as plastics typified by polyethylene terephthalate (PET), polyethylene naphthalate (PEN), and polyether sulfone (PES), or acrylic can be used, for example.

As the conductive layer 610, the conductive layer 615, the gate line 630, and the common potential line 632, an element selected from aluminum (Al), copper (Cu), titanium (Ti), tantalum (Ta), tungsten (W), molybdenum (Mo), chromium (Cr), neodymium (Nd), and scandium (Sc), an alloy containing any of these elements, or a nitride containing any of these elements can be used. A stacked structure of these materials can also be used.

As the gate insulating layer 611, an insulator such as silicon oxide, silicon nitride, silicon oxynitride, silicon nitride oxide, aluminum oxide, or tantalum oxide can be used. A stacked structure of these materials can also be used. Note that silicon oxynitride refers to a substance which contains more oxygen than nitrogen and contains oxygen, nitrogen, silicon, and hydrogen at given concentrations ranging from 55 atomic percent to 65 atomic percent, 1 atomic percent to 20 atomic percent, 25 atomic percent to 35 atomic percent, and 0.1 atomic percent to 10 atomic percent, respectively, where the total percentage of atoms is 100 atomic percent. Further, the silicon nitride oxide film refers to a film which contains more nitrogen than oxygen and contains oxygen, nitrogen, silicon, and hydrogen at given concentrations ranging from 15 atomic percent to 30 atomic percent, 20 atomic percent to 35 atomic percent, 25 atomic percent to 35 atomic percent, and 15 atomic percent to 25 atomic percent, respectively, where the total percentage of atoms is 100 atomic percent.

As the semiconductor layer 612, a material whose main constituent element belongs to Group 14 of the periodic table such as silicon (Si) and germanium (Ge), a compound such as silicon germanium (SiGe) and gallium arsenide (GaAs), an oxide such as zinc oxide (ZnO) and zinc oxide including indium (In) and gallium (Ga), or a semiconductor material such as an organic compound having semiconductor characteristics can be used. Further, a stacked layer formed using these semiconductor materials can also be used.

As the conductive layer 613, the conductive layer 614, and the source line 631, an element selected from aluminum (Al), copper (Cu), titanium (Ti), tantalum (Ta), tungsten (W), molybdenum (Mo), chromium (Cr), neodymium (Nd), and scandium (Sc), an alloy containing any of these elements, or a nitride containing any of these elements can be used. A stacked structure of these materials can also be used.

As the gate insulating layer 620, a silicon oxide layer, a silicon nitride layer, a silicon oxynitride layer, or a silicon nitride oxide layer, an insulator such as aluminum oxide, tantalum oxide, or the like can be used. Alternatively, an organic material such as polyimide, polyamide, polyvinyl phenol, benzocyclobutene, acrylic, or epoxy; a siloxane material such as a siloxane resin; an oxazole resin; or the like can be also applied. Siloxane includes a skeleton formed from a bond of silicon (Si) and oxygen (O). As a substituent, an organic group (e.g., an alkyl group or aromatic hydrocarbon) or a fluoro group may be used. The organic group may contain a fluoro group.

As the pixel electrode 616, an element selected from aluminum (Al), copper (Cu), titanium (Ti), tantalum (Ta), tungsten (W), molybdenum (Mo), chromium (Cr), neodymium (Nd), and scandium (Sc), an alloy containing any of these elements, or a nitride containing any of these elements can be used. A stacked structure of these materials can also be used. Further, a light-transmitting conductive material such as indium oxide containing tungsten oxide, indium zinc oxide containing tungsten oxide, indium oxide containing titanium oxide, indium tin oxide containing titanium oxide, indium tin oxide, indium zinc oxide, indium tin oxide to which silicon oxide is added, or the like can be used.

As a charged particles included in the layer 618 including charged particles, titanium oxide can be used for particles positively charged and carbon black can be used for particles negatively charged. Note that a single material selected from a conductive material, an insulating material, a semiconductor material, a magnetic material, a liquid crystal material, a ferroelectric material, an electroluminescent material, an electrochromic material, or a magnetophoretic material or formed of a composite material of any of these can be used.

The counter electrode 617 can be formed using a conductive material having a light-transmitting property such as indium oxide containing tungsten oxide, indium zinc oxide containing tungsten oxide, indium oxide containing titanium oxide, indium tin oxide containing titanium oxide, indium tin oxide, indium zinc oxide, or indium tin oxide to which silicon oxide is added, for example.

The substrate 604 can be formed using a light-transmitting substrate typified by a glass substrate such as a barium borosilicate glass substrate, an aluminoborosilicate glass substrate, and a soda lime glass substrate, or a flexible substrate formed using polyethylene terephthalate (PET) or the like.

Note that the whole of or part of contents described in this embodiment can be combined with any of the whole of or part of contents described in any of the other embodiments.

Embodiment 3

In this embodiment, an example of a thin film transistor which is different form the transistor included in a display device in Embodiment 2 will be described with reference to FIGS. 7A to 7D. FIGS. 7A to 7D illustrate examples of the thin film transistor which can be applied to the thin film transistor 601 in Embodiment 2.

A thin film transistor 700 is provided over a substrate 701 in FIGS. 7A to 7D. In addition, an insulating layer 702 and an insulating layer 707 are provided over the thin film transistor 700.

Figure 7A:
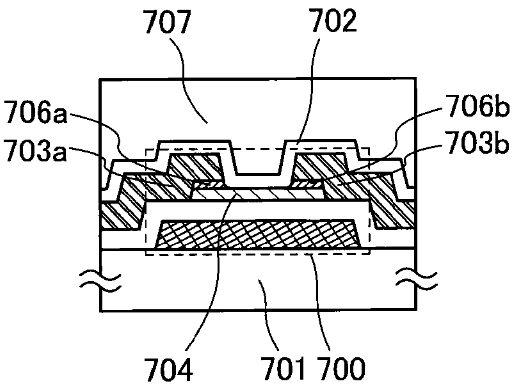
FIGS. 7A to 7D each illustrate one example of a thin film transistor.

The thin film transistor 700 in FIG. 7A has a structure in which low resistive semiconductor layers 706*a* and 706*b* are provided between conductive layers 703*a* and 703*b*, which function as a first terminal and a second terminal, and a semiconductor layer 704. By the low resistive semiconductor layers 706*a* and 706*b*, the conductive layer 703*a* and 703*b* make an ohmic contact with the semiconductor layer 704. Note that the low resistive semiconductor layers 706*a* and 706*b* are semiconductor layers with less resistivity than the semiconductor layer 704.

Figure 7B:
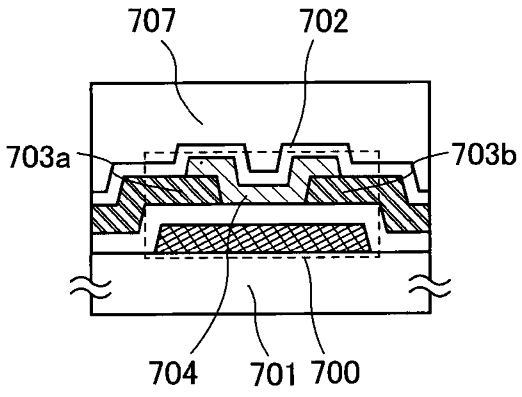

The thin film transistor 700 in FIG. 7B is a bottom-gate thin film transistor and has a structure in which the semiconductor layer 704 is provided over the conductive layers 703*a* and 703*b*.

Figure 7C:
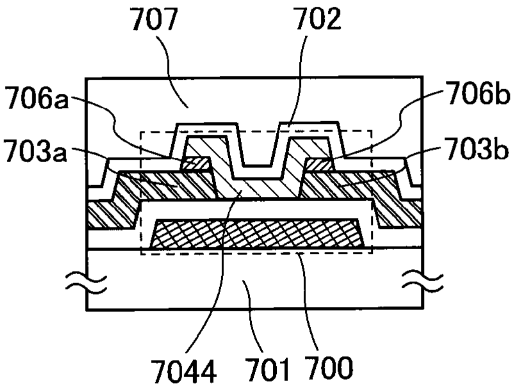

The thin film transistor 700 in FIG. 7C is a bottom-gate thin film transistor and has a structure in which the semiconductor layer 704 is provided over the conductive layers 703*a* and 703*b*. Further, a structure in which the low resistive semiconductor layers 706*a* and 706*b* are provided between the conductive layers 703*a* and 703*b*, which function as a first terminal and a second terminal, and the semiconductor layer 704.

Figure 7D:
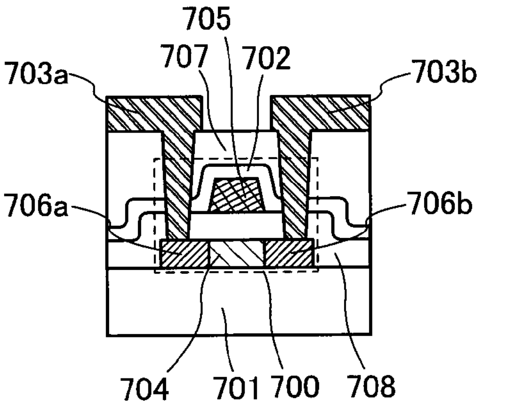

The thin film transistor 700 in FIG. 7D is a top-gate thin film transistor. Over the substrate 701, the semiconductor layer 704 including the low resistive semiconductor layers 706*a* and 706*b* that function as a source region or a drain region is provided. An insulating layer 708 is provided over the semiconductor layer 704. A conductive layer 705 that functions as a gate terminal is provided over the insulating layer 708. Furthermore, the conductive layers 703*a* and 703*b*, which function as a first terminal and a second terminal, in contact with the low resistive semiconductor layers 706*a* and 706*b*, respectively, are provided.

In this embodiment, a thin film transistor with a single gate structure is described. However, the thin film transistor can have a double gate structure or the like. In that case, a gate electrode layer may be provided above and below the semiconductor layer, or a plurality of gate electrode layers may be provided only on one side of (above or below) the semiconductor layer.

Further, a material used for the semiconductor layer of the thin film transistor is not particularly limited. An example of a material which can be used for the semiconductor layer of the thin film transistor will be described.

The semiconductor layer included in a semiconductor element can be formed using the following material: an amorphous semiconductor manufactured by a sputtering method or a vapor-phase growth method using a semiconductor material gas typified by silane or germane; a polycrystalline semiconductor formed by crystallizing the amorphous semiconductor with the use of light energy or thermal energy; a microcrystalline (also referred to as semiamorphous or microcrystal) semiconductor; or the like. The semiconductor layer can be formed by a sputtering method, a LPCVD method, a plasma CVD method, or the like.

The microcrystalline semiconductor belongs to a metastable state of an intermediate between amorphous and single crystalline when Gibbs free energy is considered. That is, the microcrystalline semiconductor film is a semiconductor having a third state which is stable in terms of free energy and has a short range order and lattice distortion. Columnar-like or needle-like crystals grow in a normal direction with respect to a substrate surface. The Raman spectrum of microcrystalline silicon, which is a typical example of a microcrystalline semiconductor, is located in lower wave numbers than 520 $cm^{-1}$, which represents a peak of the Raman spectrum of single crystal silicon. That is, the peak of the Raman spectrum of the microcrystalline silicon exists between 520 $cm^{-1}$ which represents single crystal silicon and 480 $cm^{-1}$ which represents amorphous silicon. In addition, microcrystalline silicon contains hydrogen or halogen of at least 1 atomic percent or more in order to terminate a dangling bond. Moreover, microcrystalline silicon contains a rare gas element such as helium, argon, krypton, or neon to further promote lattice distortion, so that stability is increased and a favorable microcrystalline semiconductor can be obtained.

The microcrystalline semiconductor film can be formed by a high-frequency plasma CVD method with a frequency of several tens to several hundreds of megahertz or with a microwave plasma CVD apparatus with a frequency of 1 GHz or more. The microcrystalline semiconductor film can be typically formed using a dilution of silicon hydride or the like such as $SiH_4$, $Si_2H_6$, $SiH_2Cl_2$, $SiHCl_3$, $SiCl_4$, or $SiF_4$ with hydrogen. With a dilution with one or plural kinds of rare gas elements of helium, argon, krypton, and neon in addition to silicon hydride and hydrogen, the microcrystalline semiconductor film can be formed. In that case, the flow rate ratio of hydrogen to silicon hydride is set to be 5:1 to 200:1, preferably 50:1 to 150:1, more preferably 100:1.

A typical example of an amorphous semiconductor is hydrogenated amorphous silicon, while a typical example of a crystalline semiconductor is polysilicon and the like. Examples of polysilicon (polycrystalline silicon) include so-called high-temperature polysilicon which contains polysilicon as a main component and is formed at a process temperature of greater than or equal to 800° C., so-called low-temperature polysilicon that contains polysilicon as a main component and is formed at a process temperature of less than or equal to 600° C., polysilicon obtained by crystallizing amorphous silicon by using an element promoting crystallization or the like, and the like. It is needless to say that a microcrystalline semiconductor or a semiconductor partly including a crystalline phase can also be used as described above.

Alternatively, as well as a simple substance such as silicon (Si) or germanium (Ge), a compound semiconductor such as GaAs, InP, SiC, ZnSe, GaN, or SiGe can be used as a material for the semiconductor layer.

In the case of using a crystalline semiconductor for the semiconductor layer, the crystalline semiconductor film may be manufactured by various methods (e.g., a laser crystallization method, a thermal crystallization method, or a thermal crystallization method using an element such as nickel that promotes crystallization). Further, when a microcrystalline semiconductor that is SAS is crystallized by laser irradiation, crystallinity thereof can be enhanced. In a case where the element which promotes crystallization is not introduced, hydrogen is released until a concentration of hydrogen contained in an amorphous silicon film becomes $1\times10^{20}$ atoms/$cm^3$ or less by heating the amorphous silicon layer at a temperature of 500° C. for one hour in a nitrogen atmosphere before irradiating the amorphous silicon layer with laser light. That is because an amorphous silicon film containing much hydrogen can be broken by laser beam irradiation.

There is no particular limitation on the method of adding a metal element into the amorphous semiconductor film as long as the metal element can exist in the surface of or inside the amorphous semiconductor film. For example, a sputtering method, a CVD method, a plasma treatment method (e.g., a plasma CVD method), an adsorption method, or a method of applying a metal salt solution can be used. Among them, the method using a solution is simple and advantageous in that the concentration of the metal element can be easily controlled. Further, at this time, an oxide film is preferably deposited by UV light irradiation in an oxygen atmosphere, thermal oxidation, treatment with ozone water or hydrogen peroxide including a hydroxyl radical, or the like in order to improve the wettability of the surface of the amorphous semiconductor film and to spread an aqueous solution on the entire surface of the amorphous semiconductor film.

Moreover, in a crystallization step in which an amorphous semiconductor film is crystallized to form a crystalline semiconductor film, an element which promotes crystallization (also referred to as a catalytic element or a metal element) may be added to the amorphous semiconductor film, and crystallization may be performed by heat treatment (at 550° C. to 750° C. for 3 minutes to 24 hours). As the element which promotes (accelerates) the crystallization, one or more of iron (Fe), nickel (Ni), cobalt (Co), ruthenium (Ru), rhodium (Rh), palladium (Pd), osmium (Os), iridium (Ir), platinum (Pt), copper (Cu), and gold (Au) can be used.

In order to remove or reduce the element which promotes crystallization from the crystalline semiconductor film, a semiconductor film containing an impurity element is formed in contact with the crystalline semiconductor film so as to function as a gettering sink. As the impurity element, an impurity element which imparts n-type conductivity, an impurity element which imparts p-type conductivity, a rare gas element, or the like can be used. For example, one or more elements selected form among phosphorus (P), nitrogen (N), arsenic (As), antimony (Sb), bismuth (Bi), boron (B), helium (He), neon (Ne), argon (Ar), krypton (Kr), and xenon (Xe) can be used. A semiconductor film containing a rare gas element is formed in contact with the crystalline semiconductor film containing the element that promotes crystallization, and then heat treatment is performed (at 550° C. to 750° C. for 3 minutes to 24 hours). The element that promotes crystallization contained in the crystalline semiconductor film moves into the semiconductor film containing a rare gas element, and thus, the element that promotes crystallization contained in the crystalline semiconductor film is removed or reduced. After that, the semiconductor film containing the rare gas element, which serves as the gettering sink, is removed.

The amorphous semiconductor film may be crystallized by a combination of heat treatment and laser light irradiation, or several times of either heat treatment or laser light irradiation.

A crystalline semiconductor film can also be formed directly over the substrate by a plasma method. Alternatively, a crystalline semiconductor film may be selectively formed over the substrate by a plasma method.

Further, an oxide semiconductor may be used as a material for the semiconductor layer. For example, zinc oxide (ZnO), tin oxide ($SnO_2$), or the like can be used. In the case of using ZnO for the semiconductor layer, $Y_2O_3$, $Al_2O_3$, $TiO_2$, a stacked layer thereof, or the like can be used for a gate insulating layer, and ITO, Au, Ti, or the like can be used for a gate electrode layer, a source electrode layer, and a drain electrode layer. In addition, In, Ga, or the like can be added to ZnO.

As the oxide semiconductor, a thin film expressed by $InMO_3(ZnO)$, (m>0) can be used. Here, M represents one or more metal elements selected from Ga, Al, Mn, and Co. For example, M can be Ga, Ga and Al, Ga and Mn, Ga and Co, or the like. Among oxide semiconductor films having a composition formula expressed by $InMO_3(ZnO)_m$ (m is larger than 0), an oxide semiconductor that contains Ga as M is referred to as an In—Ga—Zn—O-based oxide semiconductor, and a thin film of the In—Ga—Zn—O-based oxide semiconductor is also referred to as an In—Ga—Zn—O-based non-single-crystal film.

As an oxide semiconductor applied to the oxide semiconductor layer, other than given above, a four-component metal oxide such as an In—Sn—Ga—Zn—O film, a three-component metal oxide such as an In—Ga—Zn—O film, an In—Sn—Zn—O film, an In—Al—Zn—O film, an Sn—Ga—Zn—O film, an Al—Ga—Zn—O film, and an Sn—Al—Zn—O-based film, or a two-component metal oxide such as an In—Ga—O film, an In—Zn—O film, an Sn—Zn—O film, an Al—Zn—O film, a Zn—Mg—O film, an Sn—Mg—O film, an In—Mg—O film, an In—O film, an Sn—O film, and a Zn—O film. Further, $SiO_2$ may be contained in the oxide semiconductor film.

Thin film transistors in which these oxide semiconductors are used as semiconductor layers have high field effect mobility. Therefore, the thin film transistor can be used not only as a transistor in a pixel portion, but also as a transistor which forms a gate driver or a source driver. That is, the pixel portion and the gate driver or the source driver can be formed over the same substrate. As the result, the manufacturing cost of the display device can be reduced, which is preferable.

Note that the whole of or part of contents described in this embodiment can be combined with any of the whole of or part of contents described in any of the other embodiments.

Embodiment 4

In this embodiment, an application example of a display device described in the above embodiment will be described with specific examples illustrated in FIGS. 8A to 8D.

Figure 8A:
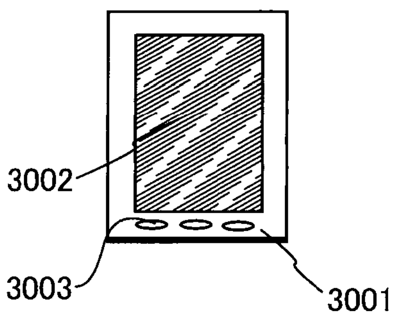
FIGS. 8A to 8D each illustrate one application example of a display device.

FIG. 8A illustrates a portable information terminal including a housing 3001, a pixel portion 3002, an operation button 3003, and the like. The display device described in the above embodiment can be applied to a display device including the pixel portion 3002.

Figure 8B:
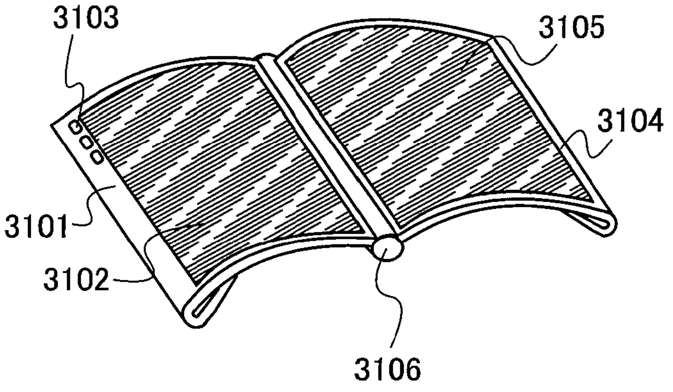

FIG. 8B illustrates an example of an electronic book reader including the display device described in the above embodiment. A first housing 3101 has a first pixel portion 3102. A second housing 3104 has a second pixel portion 3105. The first housing 3101 and the second housing 3104 are combined with a supporting portion 3106 so that the electronic book reader can be opened and closed with the supporting portion 3106. With such a structure, operation like a paper book can be achieved.

Figure 8C:
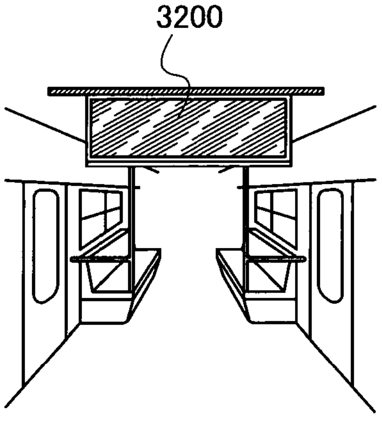

FIG. 8C illustrate a display device 3200 for an advertisement in a vehicle such as a train. In the case where an advertising medium is printed paper, the advertisement is replaced by manpower; however, by using a display device which performs display by a gray scale storage display element, the advertising display can be changed in a short time without a lot of manpower. Furthermore, stable images can be obtained without display defects.

Figure 8D:
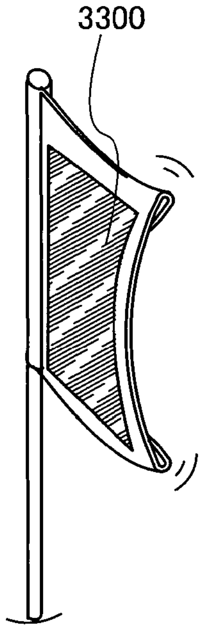

FIG. 8D illustrates a display device 3300 for an outdoor advertisement. A display device formed using a flexible substrate is waved, and advertising effectiveness can be enhanced. In general, the advertisement is replaced by manpower; however, by using a display device which performs display by a gray scale storage display element, the advertising display can be changed in a short time. Furthermore, stable images can be obtained without display defects.

Note that the whole of or part of contents described in this embodiment can be combined with any of the whole of or part of contents described in any of the other embodiments.

This application is based on Japanese Patent Application serial no. 2009-214961 filed with Japan Patent Office on Sep. 16, 2009, the entire contents of which are hereby incorporated by reference.

REFERENCE NUMERALS

100: display device; 101: pixel portion; 102: source driver; 103: gate driver; 104: control portion; 105: source line; 106: gate line; 107: pixel; 111: transistor; 112: capacitor; 113: electrophoresis element; 121: electrode; 122: electrode; 123: layer including charged particle; 124: white particle; 125: black particle; 126: microcapsule; 600: substrate; 601: thin film transistor; 602: capacitor; 603: electrophoresis element; 604: substrate; 610: conductive layer; 611: insulating layer; 612: semiconductor layer; 613: conductive layer; 614: conductive layer; 615: conductive layer; 616: pixel electrode; 617: counter electrode; 618: layer including charged particle; 620: insulating layer; 630: gate line; 631: source line; 632: common potential line; 700: thin film transistor; 701: substrate; 702: insulating layer; **703*a*: conductive layer; 703*b*: conductive layer; 704: semiconductor layer; 705: conductive layer; 706*a*: low resistive semiconductor layer; 706*b*: low resistive semiconductor layer; 707: insulating layer; 708: insulating layer; 3001: housing; 3002: pixel portion; 3003: operation button; 3101: housing; 3102: pixel portion; 3103: operation button; 3104: housing; 3105: pixel portion; 3106: supporting portion; 3200: display device; 3300**: display device.

The invention claimed is:

1. A driving method of a display device comprising a plurality of pixels, each including gray scale storage display element, the driving method comprising the steps of:

displaying a first gray scale level by a step of scanning and inputting signals to first terminals of the gray scale storage display elements plural times in a first initialization period; wherein a common potential is inputted to second terminals of the gray scale storage display elements, displaying a second gray scale level by a step of scanning and inputting signals to the first terminals at least once in a second initialization period sequentially after the first initialization period; and displaying a third gray scale level by a step of scanning and inputting signals to the first terminals plural times in a writing period sequentially after the second initialization period, wherein each of the signals inputted to the first terminals in the first initialization period selects a first potential equal to the common potential or a second potential different from the common potential in each of scanning plural times, and wherein lengths of the holding periods between inputting the signals plural times in the first initialization period are different.

2. The driving method of the display device according to claim 1, wherein the step of scanning and inputting of the signals is performed once to the first terminals in the second initialization period.

3. The driving method of the display device according to claim 1, wherein at least one signal inputted to the first terminals in the second initialization period is each a second potential generating a second electric field between the second potential and the common potential, which has a reverse direction to a first electric field generated between the first potential and the common potential, and wherein the signals inputted to the first terminals in the writing period contains at least one of the common potential, the first potential, or the second potential.

4. The driving method of the display device according to claim 1, wherein at least one signal inputted to the first terminals in the second initialization period is each the common potential or a second potential generating a second electric field between the second potential and the common potential, which has a reverse direction to a first electric field generated between the first potential and the common potential, and wherein the signals inputted to the first terminals in the writing period contains at least one of the common potential, the first potential, or the second potential.

5. The driving method of the display device according to claims 1, wherein, the common potential is inputted to the first terminals in the last scanning of the signals at an end of the writing period.

6. The driving method of the display device according to claims 1, wherein the step of scanning and inputting the signals is performed x times (x is a natural number which is 2 or more) in the first initialization period and a length of the shortest holding period of a signal is t, a length of each of holding periods after inputting the signals is $2^{y\ 1}t$ (y is any one of natural numbers which are x or less).

7. The driving method of the display device according to claims 1, lengths of the holding periods after inputting the signals in the writing period are same.

8. The driving method of the display device according to claim 1, wherein the gray scale storage display element is an electrophoresis element.

9. A display device with a pixel portion comprising:

a source driver;

a gate driver;

a plurality of pixels, each pixel including:

a gray scale storage display element;

a transistor whose a gate terminal electrode is electrically connected to the gate driver, a first terminal electrode of the transistor is electrically connected to the source driver, and a second electrode terminal of the transistor is electrically connected to a first terminal of the gray scale storage display element, and a capacitor having a first capacitor electrode terminal is electrically connected to a second terminal of the transistor and a second capacitor electrode terminal electrically connected to a wiring supplying a common potential, wherein a first gray scale level is displayed by a step of scanning and inputting signals to first terminals of the gray scale storage display elements plural times in a first initialization period;

wherein the common potential is inputted to second terminals of the gray scale storage display elements, a second gray scale level displayed by a step of scanning and inputting signals to the first terminals at least once in a second initialization period sequentially after the first initialization period; and a third gray scale level displayed by a step of scanning and inputting signals to the first terminals plural times in a writing period sequentially after the second initialization period, wherein each of the signals inputted to the first terminals in the first initialization period selects a first potential equal to the common potential or a second potential different from the common potential in each of scanning plural times, and wherein each gray scale storage display elements has holding periods of different length between the signals inputted plural times in the first initialization period.

10. The display device according to claim 9, wherein the step of scanning and inputting the signals are inputted once to the first terminals in the second initialization period.

11. The display device according to claim 9, wherein at least one signal inputted to the first terminals in the second initialization period is each a second potential generating a second electric field between the second potential and the common potential, which has a reverse direction to a first electric field generated between the first potential and the common potential, and wherein the signals inputted to the first terminals in the writing period contains at least one of the common potential, the first potential, or the second potential.

12. The display device according to claim 9, wherein at least one signal inputted to the first terminals in the second initialization period is each the common potential or a second potential generating a second electric field between the second potential and the common potential, which has a reverse direction to a first electric field generated between the first potential and the common potential, and wherein the signals inputted to the first terminals in the writing period contains at least one of the common potential, the first potential, or the second potential.

13. The display device according to claim 9, wherein the common potential is inputted to the first terminals in the last scanning of the signals at an end of the writing period.

14. The display device according to claim 9, wherein the step of scanning and inputting the signals is performed x times (x is a natural number which is 2 or more) in the first initialization period and a length of the shortest holding period of a signal is t, a length of each of holding periods after inputting the signals is $2^{y\ 1}t$ (y is any one of natural numbers which are x or less).

15. The display device according to claim 9, lengths of the holding periods after inputting the signals in the writing period are same.

16. The display device according to claim 9, wherein the gray scale storage display element is an electrophoresis element.

17. The display device according to claim 9, wherein the transistor comprises an oxide semiconductor.

18. A driving method of a display device comprising a plurality of pixels, each including gray scale storage display element, the driving method comprising the steps of:

displaying a first gray scale level by a step of scanning and inputting signals to first terminals of the gray scale storage display elements through transistors plural times until when each of the gray scale storage display elements displays the first gray scale level in a first initialization period; wherein a common potential is inputted to second terminals of the gray scale storage display elements, displaying a second gray scale level by a step of scanning and inputting signals to the first terminals at least once in a second initialization period sequentially after the first initialization period; and displaying a third gray scale level by a step of scanning and inputting signals to the first terminals plural times until when each of the gray scale storage display elements displays the third gray scale level in a writing period sequentially after the second initialization period, wherein each of the signals inputted to the first terminals in the first initialization period selects a first potential equal to the common potential or a second potential different from the common potential in each of scanning plural times, and wherein each gray scale storage display elements has holding periods of different length between the signals plural times inputted in the first initialization period.

19. The driving method of the display device according to claim 18, wherein the step of scanning and inputting of the signals is performed once to the first terminals in the second initialization period.

20. The driving method of the display device according to claim 18, wherein at least one signal inputted to the first terminals in the second initialization period is each a second potential generating a second electric field between the second potential and the common potential, which has a reverse direction to a first electric field generated between the first potential and the common potential, and wherein the signals inputted to the first terminals in the writing period contains at least one of the common potential, the first potential, or the second potential.

21. The driving method of the display device according to claim 18, wherein at least one signal inputted to the first terminals in the second initialization period is each the common potential or a second potential generating a second electric field between the second potential and the common potential, which has a reverse direction to a first electric field generated between the first potential and the common potential, and wherein the signals inputted to the first terminals in the writing period contains at least one of the common potential, the first potential, or the second potential.

22. The driving method of the display device according to claims 18, wherein, the common potential is inputted to the first terminals in the last scanning of the signals at an end of the writing period.

23. The driving method of the display device according to claims 18, wherein the step of scanning and inputting the signals is performed x times (x is a natural number which is 2 or more) in the first initialization period and a length of the shortest holding period of a signal is t, a length of each of holding periods after inputting the signals is $2^{y\ 1}$t (y is any one of natural numbers which are x or less).

24. The driving method of the display device according to claims 18, lengths of the holding periods after inputting the signals in the writing period are same.

25. The driving method of the display device according to claim 18, wherein the gray scale storage display element is an electrophoresis element.

26. The driving method of the display device according to claim 18, wherein the transistors comprise an oxide semiconductor.

27. A display device with a pixel portion comprising:

a source driver;

a gate driver;

a plurality of pixels, each pixel including:

a gray scale storage display element;

a transistor whose a gate terminal electrode is electrically connected to the gate driver, a first terminal electrode of the transistor is electrically connected to the source driver, and a second electrode terminal of the transistor is electrically connected to a first terminal of the gray scale storage display element, and a capacitor having a first capacitor electrode terminal is electrically connected to a second terminal of the transistor and a second capacitor electrode terminal electrically connected to a wiring supplying a common potential, wherein a first gray scale level is displayed by a step of scanning and inputting signals to first terminals of the gray scale storage display elements through transistors plural times until when each of the gray scale storage display elements displays the first gray scale level in a first initialization period; wherein the common potential is inputted to second terminals of the gray scale storage display elements, a second gray scale level displayed by a step of scanning and inputting signals to the first terminals at least once in a second initialization period sequentially after the first initialization period; and a third gray scale level displayed by a step of scanning and inputting signals to the first terminals plural times until when each of the gray scale storage display elements displays the first gray scale level in a writing period sequentially after the second initialization period, wherein each of the signals inputted to the first terminals in the first initialization period selects a first potential equal to the common potential or a second potential different from the common potential in each of scanning plural times, and wherein each gray scale storage display elements has holding periods of different length between the signals plural times inputted in the first initialization period.

28. The display device according to claim 27, wherein the step of scanning and inputting the signals are performed once to the first terminals in the second initialization period.

29. The display device according to claim 27, wherein at least one signal inputted to the first terminals in the second initialization period is each a second potential generating a second electric field between the second potential and the common potential, which has a reverse direction to a first electric field generated between the first potential and the common potential, and wherein the signals inputted to the first terminals in the writing period contains at least one of the common potential, the first potential, or the second potential.

30. The display device according to claim 27, wherein at least one signal inputted to the first terminals in the second initialization period is each the common potential or a second potential generating a second electric field between the second potential and the common potential, which has a reverse direction to a first electric field generated between the first potential and the common potential, and wherein the signals inputted to the first terminals in the writing period contains at least one of the common potential, the first potential, or the second potential.

31. The display device according to claim 27, wherein the common potential is inputted to the first terminals in the last scanning of the signals at an end of the writing period.

32. The display device according to claim 27, wherein the step of scanning and inputting the signals is performed x times (x is a natural number which is 2 or more) in the first initialization period and a length of the shortest holding period of a signal is t, a length of each of holding periods after inputting the signals is $2^{y\ 1}t$ (y is any one of natural numbers which are x or less).

33. The display device according to claim 27, lengths of the holding periods after inputting the signals in the writing period are same.

34. The display device according to claim 27, wherein the gray scale storage display element is an electrophoresis element.

35. The display device according to claim 27, wherein the transistor comprises an oxide semiconductor.

* * * * *